United States Patent
Akiyama et al.

(10) Patent No.: US 7,636,808 B2
(45) Date of Patent: Dec. 22, 2009

(54) SEMICONDUCTOR DEVICE

(75) Inventors: Satoru Akiyama, Kokubunji (JP); Takeshi Sakata, Hino (JP); Takao Watanabe, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 10/790,880

(22) Filed: Mar. 3, 2004

(65) Prior Publication Data
US 2004/0225829 A1 Nov. 11, 2004

(30) Foreign Application Priority Data
May 9, 2003 (JP) ............................. 2003-130986

(51) Int. Cl.
G06F 12/08 (2006.01)
G11C 8/00 (2006.01)

(52) U.S. Cl. ........................ 711/5; 711/143; 711/104; 365/230.03

(58) Field of Classification Search ............... None
See application file for complete search history.

(56) References Cited

U.S. PATENT DOCUMENTS

| | | | |
|---|---|---|---|
| 5,361,227 A | | 11/1994 | Tanaka et al. |
| 5,488,711 A * | | 1/1996 | Hewitt et al. ............ 711/103 |
| 5,530,828 A | | 6/1996 | Kaki et al. |
| 5,999,474 A | | 12/1999 | Leung et al. |
| 6,075,740 A | | 6/2000 | Leung |
| 6,263,398 B1 * | | 7/2001 | Taylor et al. ............ 711/3 |
| 6,285,626 B2 | | 9/2001 | Mizuno et al. |
| 6,487,135 B2 | | 11/2002 | Watanabe et al. |
| 6,704,835 B1 * | | 3/2004 | Garner ............ 711/103 |
| 6,771,531 B2 | | 8/2004 | Nishihara |
| 6,848,035 B2 * | | 1/2005 | Akiyama et al. ........... 711/156 |
| 7,301,791 B2 * | | 11/2007 | Atwood et al. ............ 365/49.1 |
| 2003/0033492 A1 | | 2/2003 | Akiyama et al. |
| 2004/0015646 A1 * | | 1/2004 | Kook et al. ................ 711/5 |
| 2004/0027857 A1 * | | 2/2004 | Ooishi ................ 365/185.11 |
| 2004/0193782 A1 * | | 9/2004 | Bordui ................ 711/103 |

FOREIGN PATENT DOCUMENTS

JP    7-093215    4/1995

(Continued)

OTHER PUBLICATIONS

Atwood, Bryan et al, "SESO Memory: A CMOS compatible with high density embedded memory technology for mobile application," *2002 Symposium on VLSI Circuit Digest of Technical Papers*, pp. 2 pages, (2000) USA.

(Continued)

*Primary Examiner*—Denise Tran
(74) *Attorney, Agent, or Firm*—Antonelli, Terry, Stout & Kraus, LLP.

(57) ABSTRACT

A semiconductor device employs a SESO memory or a phase change memory which has a smaller memory cell area than SRAM. The semiconductor device has a plurality of memory banks each composed of the SESO or phase change memories, and a cache memory which has a number of ways equal to the ratio of a write speed (m) to a read speed (n). The semiconductor device controls the cache memory such that a write back operation is not repeated on the same memory bank.

19 Claims, 20 Drawing Sheets

FOREIGN PATENT DOCUMENTS

| JP | 10-112191 | 4/1998 |
|---|---|---|
| JP | 11-353871 | 12/1999 |
| JP | A 2003-59265 | 2/2003 |
| JP | A 2003-157687 | 5/2003 |
| JP | 2003-228977 | 8/2003 |
| JP | A 2002-26180 | 8/2003 |

OTHER PUBLICATIONS

Lai, Stefan et al, "OUM—A 180 nm nonvolatile memory cell element technology for stand alone and embedded applications," *2001 IEEE International Electron Devices Meeting Digest of Technical Papers*, 4 pages (2001), USA.

"Combination Memories" searched on the Internet on Apr. 28. 2003 <URL:http://www.sharp-world.com/products/device/flash/cmlist.html>, pp. 1-3.

Hwang, Chorng-Lii et al, "A 2.9ns Random Access Cycle Embedded DRAM with a Destructive-Read Architecture", *2002 Symposium on VLSI Circuits Digest of Technical Papers*, pp. 174-175, USA.

Atwood et al, Bryan—"SESO Memory: A CMOS Compatible High Density Embedded Memory Technology for Mobile Applications," Technical Report of IEICE, Dec. 12, 2002, vol. 102, No. 525, pp. 43-46.

\* cited by examiner

READ ACCESS, CACHE HIT

BANK ADDRESS '2', ENTRY 1

READ ACCESS, CACHE MISS

BANK ADDRESS '1', ENTRY 2

WRITE ACCESS, CACHE HIT

BANK ADDRESS '2', ENTRY 1

WRITE ACCESS, CACHE MISS

BANK ADDRESS '0', ENTRY 1

CYCLE #1:WRITE ACCESS,CACHE MISS

BANK ADDRESS '0', ENTRY 1

CYCLE #2:WRITE ACCESS,CACHE MISS

BANK ADDRESS '1', ENTRY 2

CYCLE #3:WRITE ACCESS,CACHE MISS

BANK ADDRESS '2', ENTRY 1

CYCLE #4:WRITE ACCESS,CACHE MISS

BANK ADDRESS '0', ENTRY 2

FIG. 12
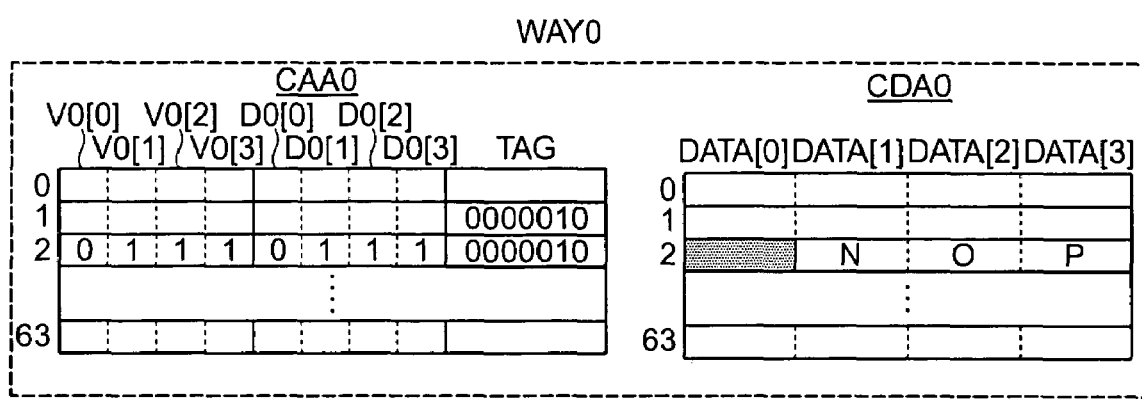
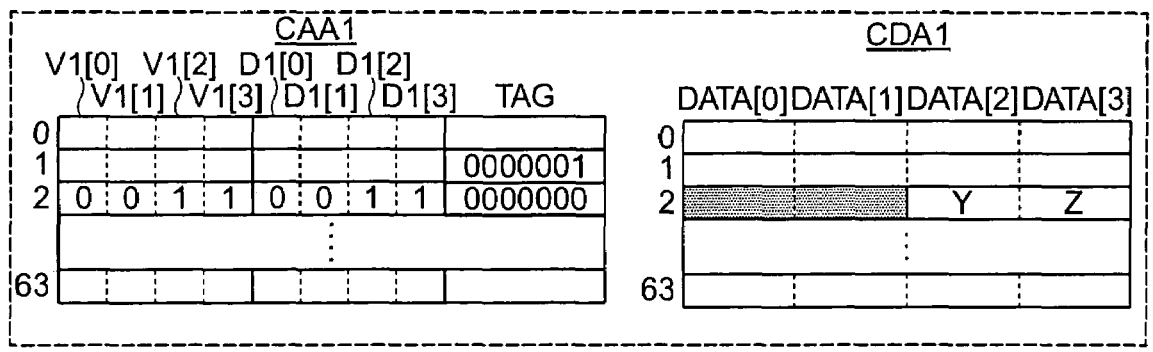

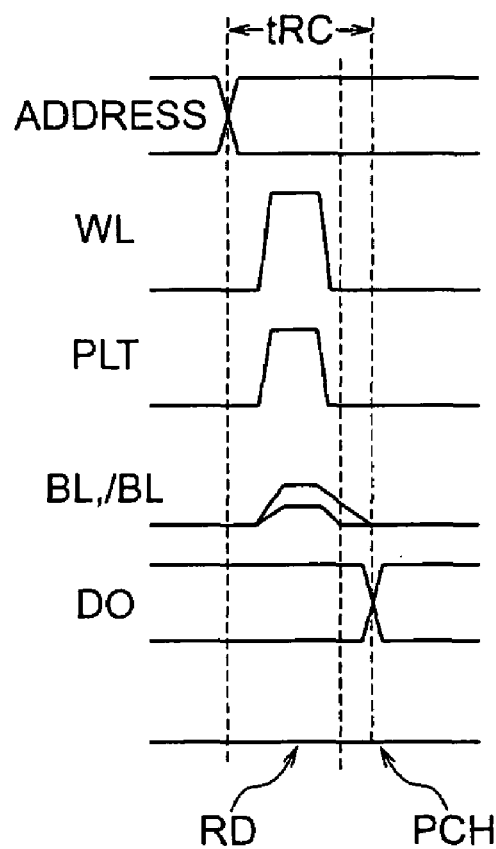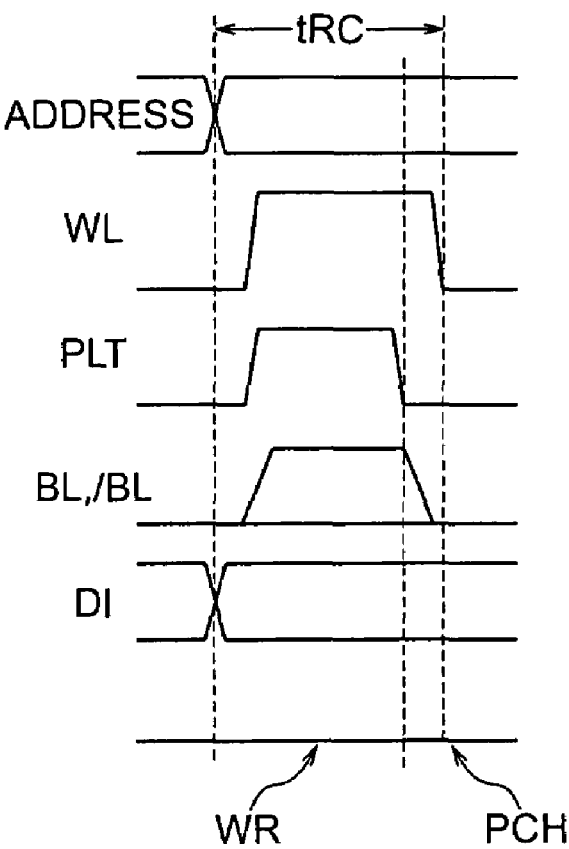

SEMICONDUCTOR DEVICE

INCORPORATION BY REFERENCE

The present application claims priority from Japanese patent application No. JP2003-130986 filed on Mar. 9th, 2003. The disclosure of the Japanese patent application is hereby incorporated by reference into this application.

BACKGROUND OF THE INVENTION

The present invention relates to technologies which are suitable for a data processor comprised of a memory control unit and a central processing unit, a data processing system comprised of a data processor and a memory, a semiconductor device which has the data processor or data processing system integrated on a single chip, and a semiconductor device which has the data processor or data processing system encapsulated in a single semiconductor package.

In recent years, mobile terminals such as a portable telephone are rapidly equipped with increasingly more functions, including music replay, gaming, communications of moving image data, and so on. It is anticipated that an increase in the amount of data resulting from additional functions of the device will require a significantly larger capacity for a memory embedded in an information processing unit (system LSI) including a microprocessor, or for a memory for external storage. Therefore, in order to implement more additional functions in mobile terminals such as a portable telephone, an increased capacity is essential to the memory embedded in the system LSI and the memory for external storage.

Static random access memories (hereinafter abbreviated as "SRAM") are typically employed in system LSIs for implementing a microprocessor (MPU) which is tailored to provide functions for commercializing mobile terminals and the like. This is because SRAM is characterized by a particularly high compatibility with logic circuits such as MPU, which facilitates the manufacturing, and by a small current required for holding data therein.

A memory for use with a mobile terminal for external storage is known, for example, from "Combination Memories" searched on the Internet on Apr. 28, 2003, <URL: http://sharp-world.com/products/device/flash/cmlist.html> which describes a composite memory comprised of SRAM and flash memory mounted in a single package. In such a composite memory, the flash memory stores programs for communications and applications, other than an operating system (OS) for a portable telephone system. The SRAM in turn includes areas for storing telephone numbers, addresses, and ringer tones, and a work area which is reserved for temporary use in execution of an application. The SRAM is likewise used in the composite memory because of its requirement of a small current for holding data therein. The composite memory, which has a plurality of memories laminated one on another, also contributes to a reduction in cost resulting from a smaller mounting area.

Before making the present invention, the inventors considered possible problems which would arise when a larger capacity of memory (i.e., SRAM) was provided for higher performance.

First, a larger capacity of SRAM-based memory would cause an increase in the chip size of LSI and a resulting increase in cost. This is because SRAM, which is comprised of six MOS transistors, has a large memory cell area. Also, a larger capacity of SRAM-based memory would cause an increase in a current required for holding data therein. This is because, in addition to an increase in the current for holding data in the additional capacity of the memory, a so-called gate leak current increases due to the use of thinner oxide insulating films required for miniaturization of MOS transistors, thereby causing a consequent increase in the current for holding data.

A solution for the foregoing problem is to use a memory cell which has a smaller memory cell area than SRAM. For example, a SESO (Single Electron Shut Off) memory is described in Bryan Atwood et al., "SESO memory: A CMOS compatible with high density embedded memory technology for mobile application," 2002 Symposium on VLSI Circuit Digest of Technical Papers, pp. 154-155, (2000). The SESO memory has a smaller memory cell area than SRAM and is therefore integrated at a higher density than SRAM, so that the use of the SESO memory can prevent an increase in the chip size to reduce the cost. In addition, the SESO memory cell exhibits an extremely small leak current, and can therefore reduce a current required for holding data therein. Of course, it should be understood that non-volatile memory cells may be utilized instead. For example, the foregoing first problem can be solved, including an increase in the chip size and the current required for holding data, by use of a non-volatile phase change memory OUM (Ovonic Unified Memory) as disclosed, for example, in Stefan Lai et al., "OUM—A 180 nm nonvolatile memory cell element technology for stand alone and embedded applications," 2001 IEEE International Electron Devices Meeting Digest of Technical Papers, pp. 803-806, (2001).

However, the foregoing SESO memory and phase change memory have a disadvantageous characteristic of a slow write operation as compared with a read operation. Thus, the inventors noted that the following second problem could arise when such memory cells were utilized to design a large capacity of memory.

When a data processing system is implemented by a central processing unit and a memory, a sequence of write operations can be successively performed in the memory. In this event, a slow write operation would cause a delay in a subsequent memory access for writing, possibly resulting in a significant degradation in system performance.

U.S. Pat. No. 5,530,828 and JP-A-7-93215 describe exemplary solutions for the problem of a memory which presents a slower write operation than a read operation. A semiconductor storage device described in U.S. Pat. No. 5,530,828 has a plurality of flash memories, so that when write operations must be performed in succession, the write operations are not concentrated on the same flash memory, but subsequent write operations are distributed to different flash memories, thereby accomplishing an apparently faster write operation. However, when a write operation is inevitably performed in the same flash memory, a subsequent write access is delayed, so that an address controller must manage an address generated by the processor and a flash memories in which data is written at the address, but such control is extremely difficult. U.S. Pat. No. 5,530,828 does not even disclose any specific solution for the management. JP-A-7-93215 in turn describes a semiconductor storage device which comprises a write buffer and a plurality of dynamic random access memories (hereinafter abbreviated as "DRAM"), wherein an external write operation is performed on the write buffer. However, JP-A-7-93215 does not take into consideration the fact that an increase in write speed is limited by the capacity of the write buffer, and that an amount of data larger than the capacity of the write buffer would cause a subsequent write operation to delay.

SUMMARY OF THE INVENTION

It is therefore an object of the present invention to provide a data processing system which is capable of eliminating a delay in memory access even if the system employs a memory which is slower in a write operation than in a read operation.

A representative solution will be summarized below for addressing the foregoing problem. Specifically, a semiconductor device according to the present invention has a plurality of memory banks each including a plurality of memory cells which are slower in a write operation than in a read operation, and a cache memory for mediating an access to the plurality of memory banks from the outside. The cache memory has the number of ways equal to or larger than a value determined by the ratio (m/n) of a write cycle (m) of the memory cells to a read cycle (n) of the memory cells.

Other objects, features and advantages of the invention will become apparent from the following description of the embodiments of the invention taken in conjunction with the accompanying drawings.

BRIEF DESCRIPTION OF THE DRAWINGS

FIG. 12 is a schematic diagram illustrating an exemplary cache memory implemented in the AF-RAM of FIG. 11;

FIGS. 19A and 19B are timing charts showing that a ferroelectric memory is made faster using a technique implemented in the present invention.

DESCRIPTION OF THE EMBODIMENTS

In the following, several embodiments of the present invention will be described in detail with reference to the accompanying drawings. It should be first noted that, though not particularly limited, transistors which are used in each block of the embodiments are formed on a single semiconductor substrate such as that made of a single crystal silicon by known integrated circuit technologies such as CMOS (complementary MOS transistor) and the like. Specifically, the transistors are formed through a step of forming a well, an element separation region, and an oxide film, followed by a step of forming a first and a second semiconductor region for defining a gate electrode and a source and a drain region, respectively. A symbol representative of MOSFET (Metal Oxide Semiconductor Field Effect Transistor) without a circle added to the gate indicates an N-type MOSFET (NMOS) which is distinguished from a P-type MOSFET (PMOS), the symbol of which has a circle added to the gate. In the following, MOSFET is referred to as the "MOS transistor" for simplicity. However, the present invention is not limited to a field effect transistor which includes an oxide film provided between a metal gate and a semiconductor layer, but can be applied to circuits using general FETs such as MISFET (Metal Insulator Semiconductor Field Effect Transistor) which includes an insulating film between a metal gate and a semiconductor layer, and the like.

First Embodiment

Figure 1:
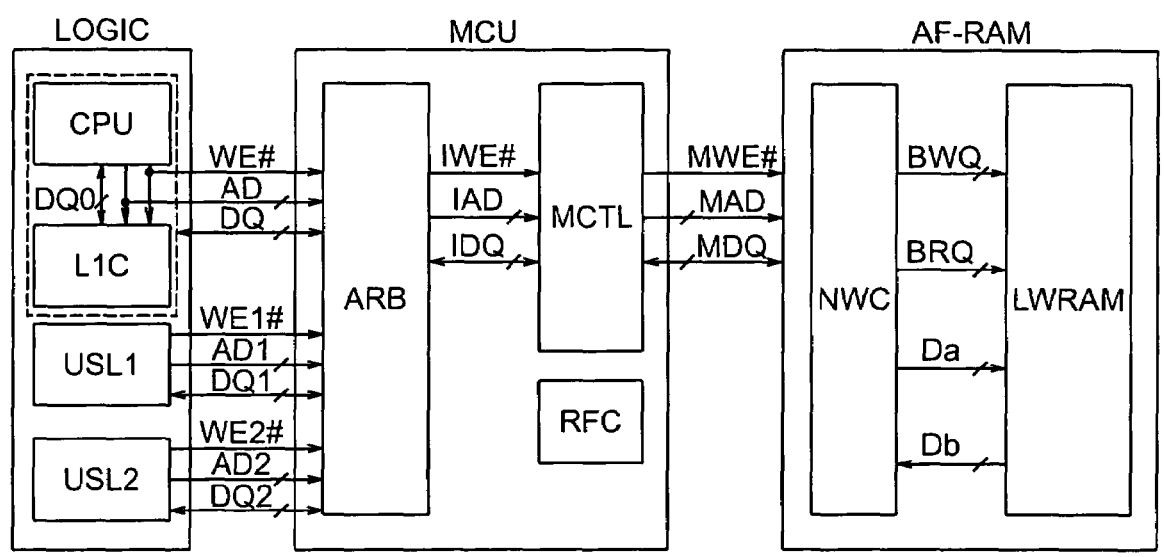
FIG. 1 is a block diagram illustrating a first embodiment of a data processing system according to the present invention.
Figure 4A:
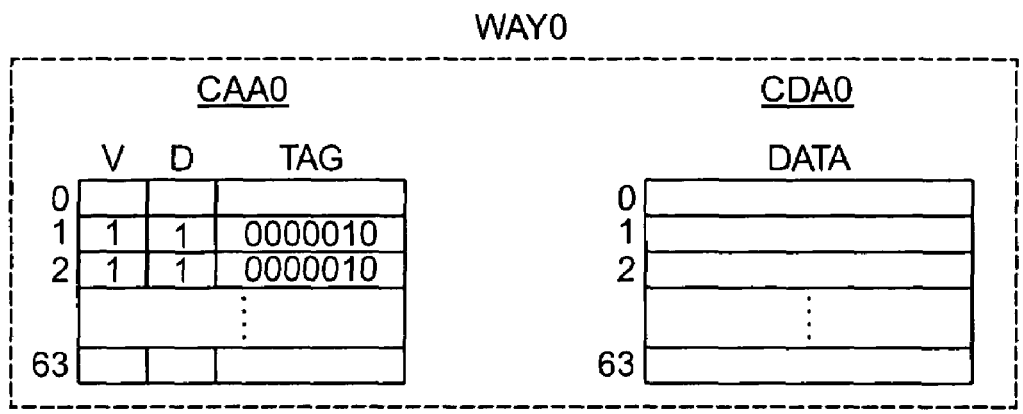
FIGS. 4A and 4B are schematic diagrams illustrating a cache memory NWC included in the AF-RAM appearing in FIG. 1.
Figure 4B:
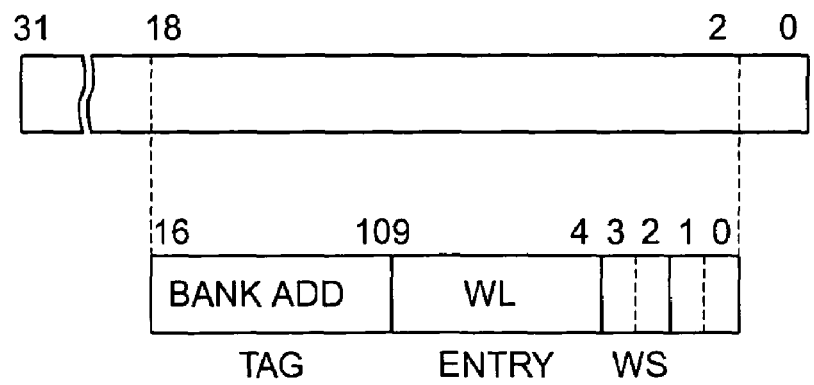
Figure 5:
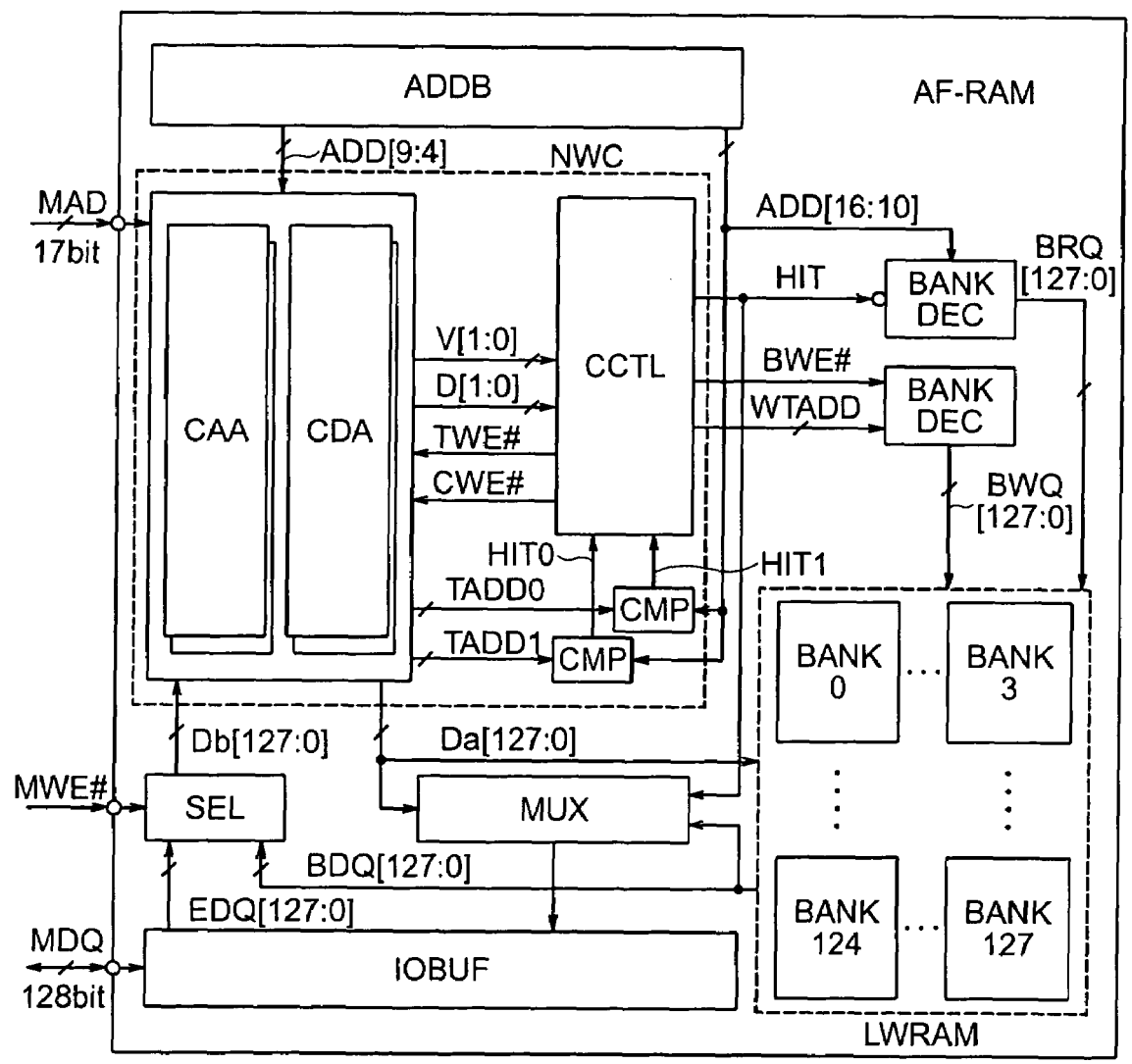
FIG. 5 is an exemplary block diagram for explaining the AF-RAM described in the first embodiment.
Figure 6:
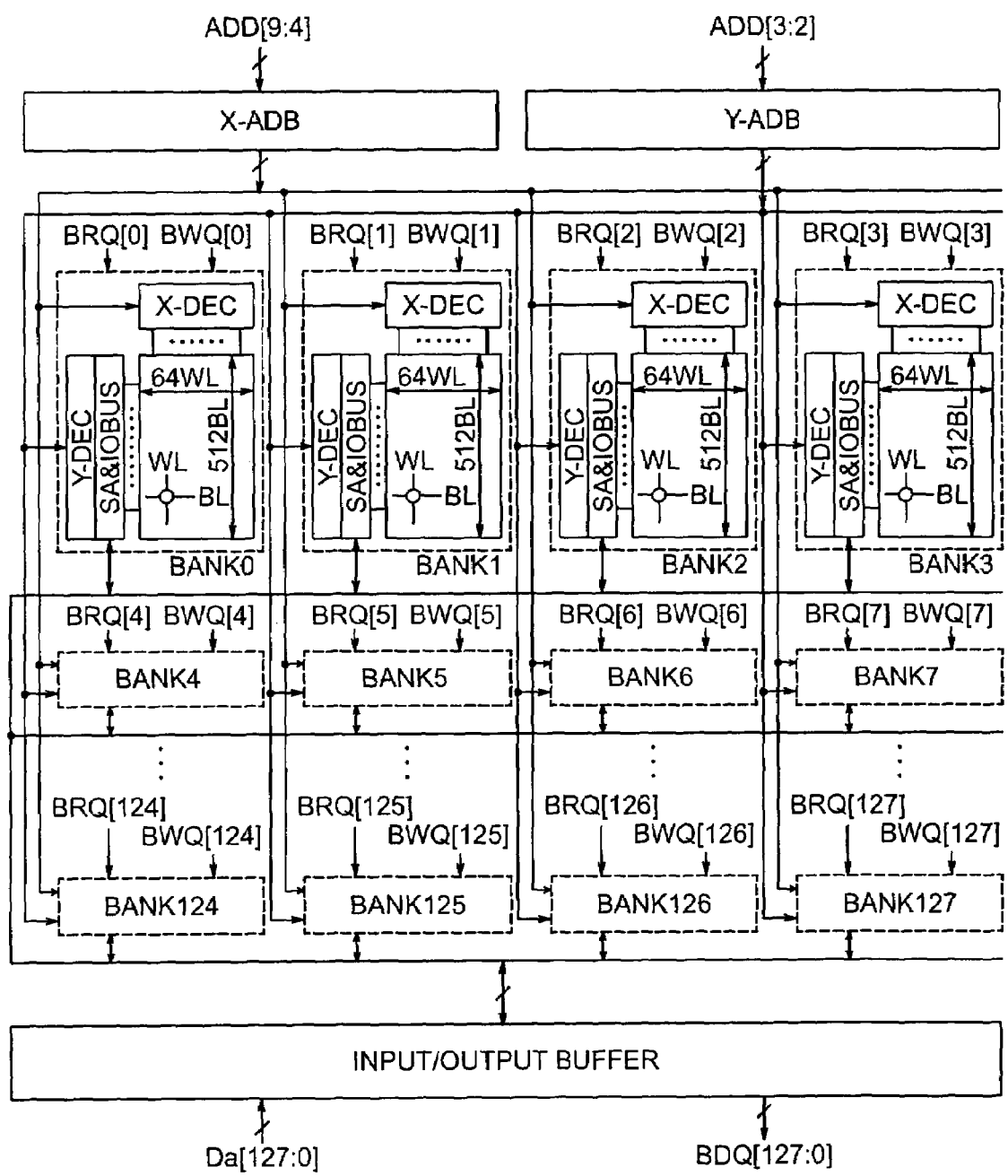
FIG. 6 is a block diagram illustrating a low-speed write memory which employs memory cells that present a slow write operation.
Figure 7A:
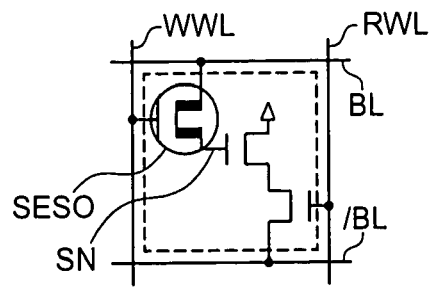
FIGS. 7A and 7B illustrate an embodiment of a SESO memory cell, and a bank comprised of the memory cells and implemented in the low-speed write memory, respectively.
Figure 7B:
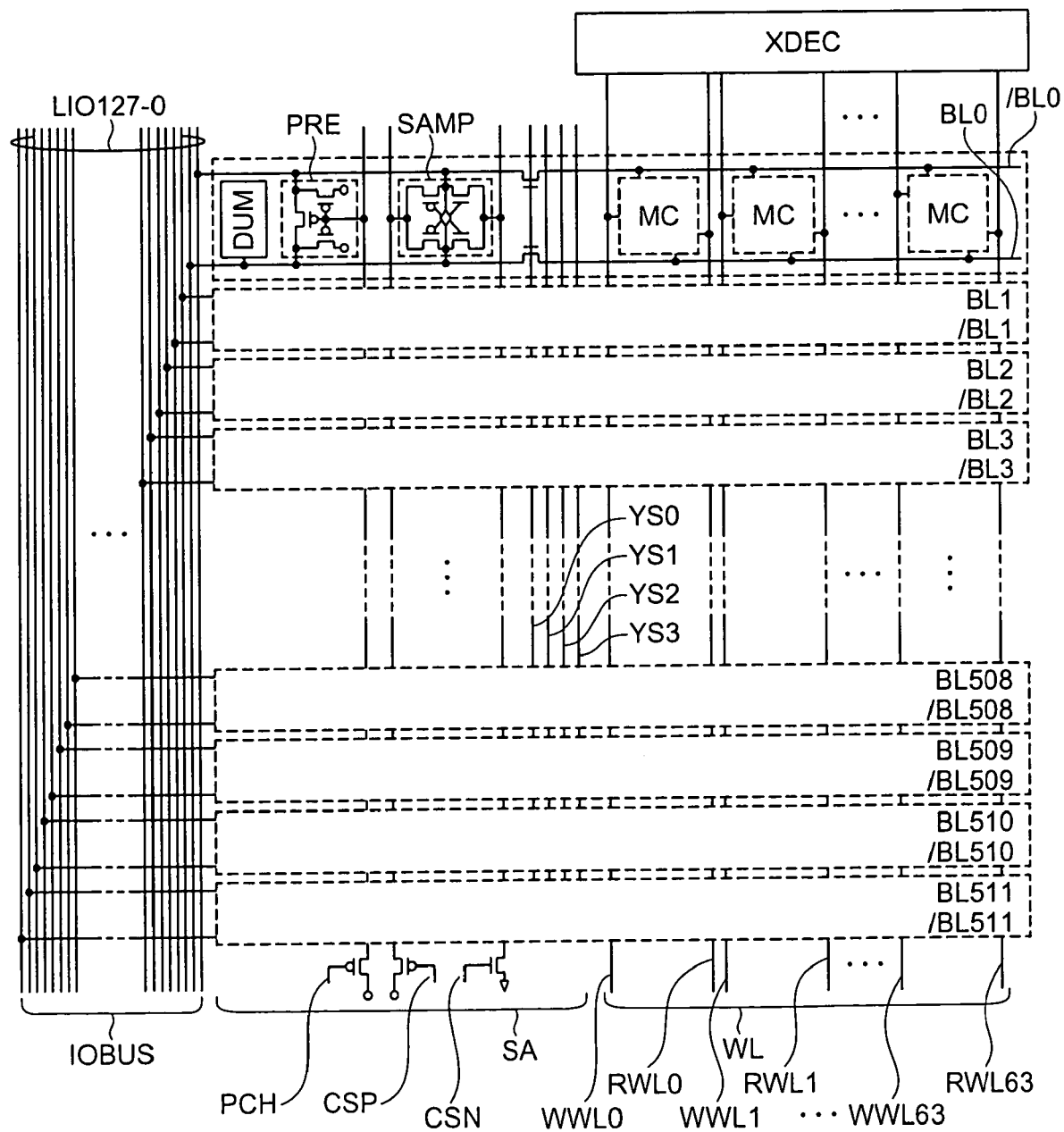
Figure 9:
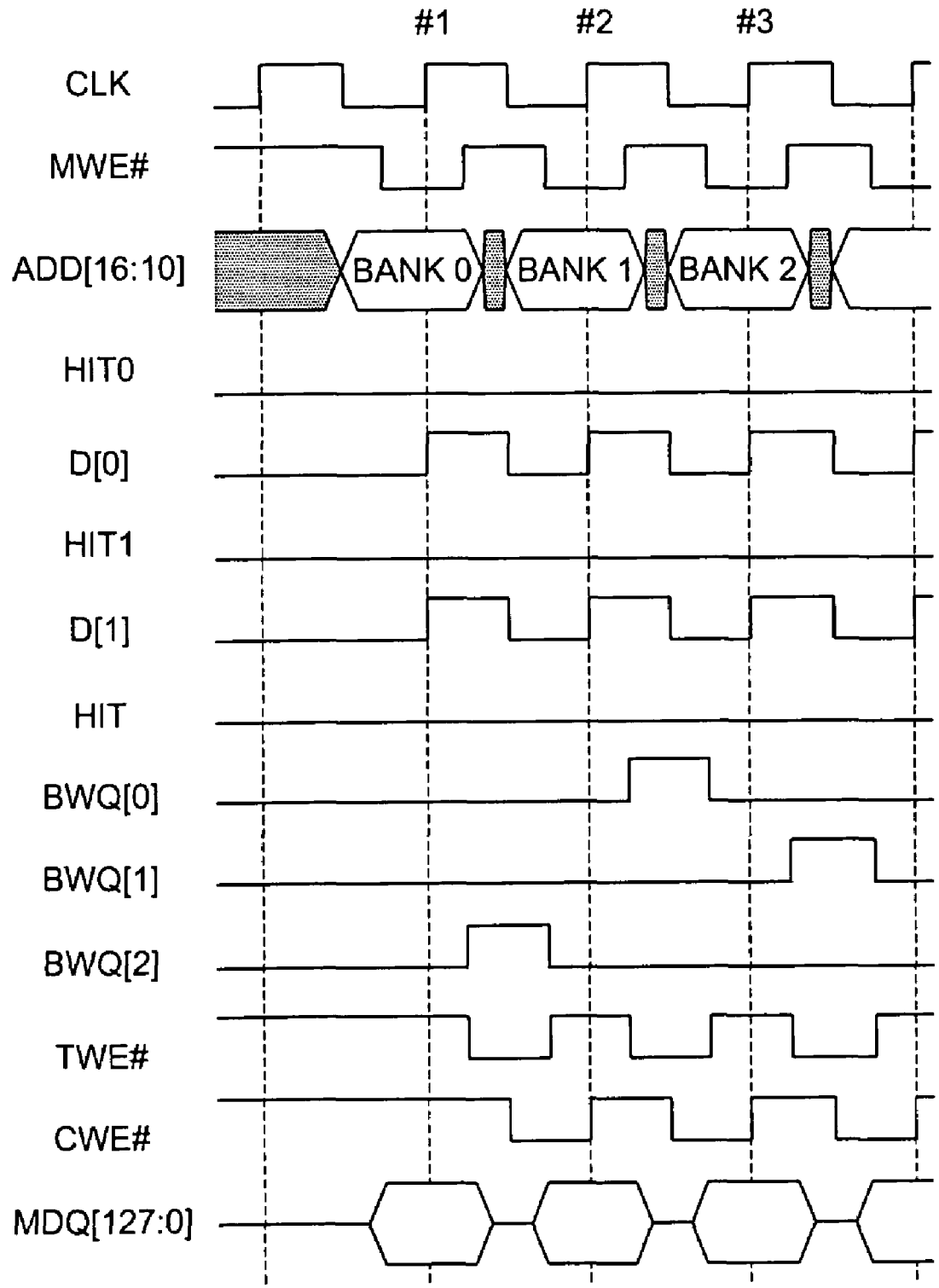
FIG. 9 is a timing chart showing that a low-speed write operation is concealed in the AF-RAM described in the first embodiment.
Figure 10:
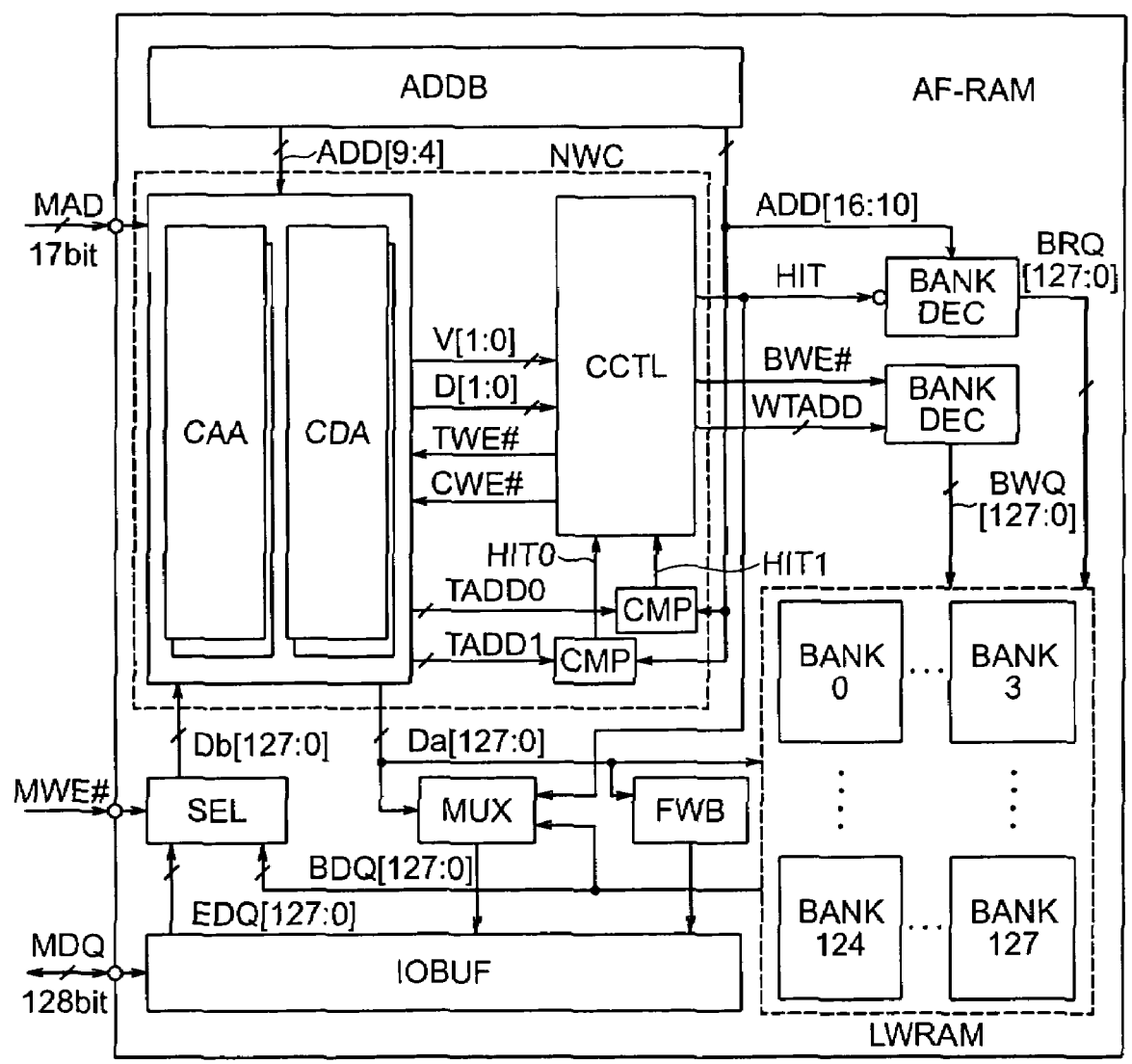
FIG. 10 is an exemplary block diagram for explaining the AF-RAM described in the first embodiment.

FIG. 1 is a block diagram illustrating a data processing system according to a first embodiment of the present invention. A memory described in the first embodiment is slower in a write operation than in a read operation, but can perform the write operation within a read operation time, and is hereinafter referred to as the "free-access random access memory (AF-RAM)." FIGS. 2 to 10 illustrate specific examples of main components which make up the AF-RAM in FIG. 1. FIGS. 2 and 3 are schematic diagrams for explaining the basic operations for controlling the AF-RAM in FIG. 1. FIGS. 4A and 4B illustrate specific examples of ways WAY0, WAY1 shown in FIG. 2. FIG. 5 illustrates the AF-RAM in FIG. 1 in a block diagram form. FIG. 6 illustrates a block diagram of a low-speed write memory (hereinafter abbreviated as "LWRAM") which forms part of the AF-RAM and is comprised of memory cells that present a slow write operation. FIGS. 7A and 7B illustrate a memory cell MC, a memory bank BANK comprised of the memory cells, which is implemented in the LWRAM, respectively. FIG. 8 is a flow chart for explaining a method of controlling the AF-RAM. FIG. 9 is a timing chart showing that a write speed is increased in the AF-RAM according to the present invention. FIG. 10 illustrates another specific example of increasing the write speed of the AF-RAM by adding a forward buffer FWB. The following description will be first focused on implementations of these components.

In the data processing system illustrated in FIG. 1, a logic unit LOGIC comprises a central processing unit CPU and user logics USL1, USL2. A cache memory L1C is connected to the CPU through a write enable signal WE#, an address bus AD, and a data bus DOO. A memory control unit MCU, which has a function of controlling accesses to the logic unit LOGIC and AF-RAM, comprises an arbiter circuit ARB, a memory controller MCTL, a refresh controller RFC, and the like. The arbiter circuit ARB determines priorities to access requests from the logic unit LOGIC, i.e., write enable signals WE#, WE1#, WE2#, address buses AD, AD1, AD2, and data buses DQ, DQ1, DQ2, and communicates necessary information to the memory controller MCTL through a write enable signal IWE#, address bus IAD, and data bus IDQ.

Upon receipt of a signal, the memory controller MCTL communicates data with the AF-RAM through a memory write enable signal MWE#, a memory address bus MAD, and a memory data bus MDQ. Here, the refresh controller RFC is required when volatile memory cells, for example, SESO memory cells are utilized for the LWRAM, but is not required when a non-volatile memory, for example, the phase change memory is utilized for the LWRAM. Thus, it should be understood that the configuration can be modified depending on specific applications.

The AF-RAM comprises a cache memory NWC having a plurality of ways, and the LWRAM comprised of memory cells which are slower in a write operation than in a read operation. While details will be described later in connection with FIG. 2 onward, the cache memory NWC is connected to the LWRAM through a bank write request signal BWQ, a bank read request signal BRQ, and data buses Da, Db. Also, the cache memory NWC comprises an SRAM memory which has a smaller storage capacity than the overall LWRAM. CMOS-SRAM typically employed in the cache memory NWC is comprised of six MOS transistors which include two latch-coupled CMOS-inverters, and two transfer gates for accessing a storage node.

The LWRAM in turn comprises memory cells having a cell area smaller than that of SRAM, i.e., a SESO memory or a phase change memory. Thus, the LWRAM can implement a memory which has a larger data storage capacity and requires a smaller current for holding data than SRAM. In addition, techniques according to the present invention, later described, do solve the problem of the slow write into memory cells. The resulting data processing system can therefore eliminate a delay in access to the AF-RAM. For the SESO memory and phase change memory themselves, see "Composite Memory" searched on the Internet on Apr. 38, 2003<URL: http://www.sharp.co.jp/products/device/flash/cmlist.html>, and Bryan Atwood et al., "SESO memory: A CMOS compatible with high density embedded memory technology for mobile application," 2002 Symposium on VLSI Circuit Digest of Technical Papers, pp. 154-155, (2000), the contents of which are incorporated by reference.

Referring next to FIGS. 2A to 2D and FIGS. 3A to 3D, WAY0 and WAY1 represent the cache memory NWC in FIG. 1, and banks Bank0-Bank3 represent specific examples of the LWRAM in FIG. 1. Each of the ways (WAY0, WAY1) has a capacity for storing data in one bank of the LWRAM. There are two ways in the cache memory NWC because the first embodiment is described for an exemplary situation in which a write cycle is twice or less as long as a read cycle.

FIGS. 4A, 4B illustrate a specific example of the ways implemented in the cache memory NWC. As illustrated in FIG. 4A, a way comprises a cache address array CAA for holding addresses, and a cache data array CDA for holding corresponding data, and additionally has flags for managing these arrays, which include a valid bit V indicating whether particular data is valid or invalid, and a dirty bit D indicating that data has been updated. FIG. 4B shows how a 32-bit physical address from the CPU or the like corresponds to an address of the AF-RAM. As can be understood from these figures, the cache address array CAA has a tag TAG which is assigned a bank address Bankadd of the LWRAM, and entries Entry0-Entry63 which correspond to a word line WL of the LWRAM. A word selector WS is used to select a pair of 128-bit lines requested from a pair of 512-bit lines of the bank BANK (described later in connection with FIG. 5). In the example illustrated in FIG. 4A, WAY0 holds data at bank address 2 in entry 1, and data at bank address 2 in entry 2, while WAY1 holds data at bank address 1 in entry 1, and data at bank address 0 at entry 2.

The number of ways in a cache memory is also referred to as a degree of association. This is because a way in a cache is provided to increase the number of accesses to the same entry address in parallel (increase the number of associated data) to increase the probability of cache hit.

FIG. 5 is a block diagram of the AF-RAM. The following description on the embodiment is made on the assumption that the AF-RAM has a total capacity of 4 Mbits and a write speed twice as low as a read speed.

The AF-RAM mainly comprises a cache memory NWC, and a LWRAM which is slower in a write operation, wherein the cache memory NWC has a number of ways that have a capacity corresponding to the ratio of a write cycle (m) of the LWRAM to a read cycle (n) of the LWRAM, i.e., the number is equal to (m/n). "m" and "n" are integer numbers. The LWRAM also has a plurality of banks which can operate independently of one another, and comprises 128 banks BANK0-BANK127 in this embodiment. The cache memory NWC comprises a cache controller CCTL and a comparator CMP other than the cache address array CAA and cache data array CDA, and controls data using such signals as a valid bit V[1:0], a dirty bit D[1:0], a tag write enable signal TWE#, a cache write enable signal CWE#, a bank write enable signal BWE#, tag address buses TADD0, TADD1, a write tag address bus WTADD, and hit signals HIT, HIT0, HIT1. Other symbols indicate a bank decoder BANKDEC, a multiplexer MUX, a selector SEL, an address buffer ADDB, an input/output buffer IOBUF, a bank read request signal BRQ[127,0], a bank write request signal BWQ[127:0], data buses Da[127:0], Db[127:0]. BDQ[127:0], EDQ[127:0], and input signals to the AF-RAM which include a memory address MAD, memory data MDQ, and a memory write enable signal MWE#. Some of control signals such as addresses ADD[16:10], ADD[9:4], ADD[3:2], a clock CLK, the memory write enable signal MWE#, which are distributed to the AF-RAM, are omitted to avoid complexity of the figure.

FIG. 6 is a block diagram illustrating the LWRAM in greater detail. The LWRAM includes 128 banks, each of which is applied with a bank read request signal BRQ and a bank write request signal BWQ. The address ADD[9:4] is inputted to a word decoder XDEC through an address buffer X-ADB to select one of 64 word lines. The address ADD[3:2] in turn is inputted to a word decoder Y-DEC through an address buffer Y-ADB to select a pair of 128-bit lines from a pair of 512-bit lines. SA&IOBUS represents a sense amplifier unit and an input/output bus, and a circle marked at the intersection of a word line WL and a bit line BL represents a memory cell MC. The LWRAM communicates data with the outside through an input/output buffer INPUT/OUTPUT BUFFER.

FIGS. 7A, 7B illustrate the bank shown in FIG. 6, wherein FIG. 7A represents the memory cell MC, and FIG. 7B depicts the configuration of a memory array including the memory cells MC. This embodiment shows a memory cell MC to which a SESO memory cell is applied. A SESO memory is a 3-transistor dynamic memory which comprises a write word line WWL, a read word line RWL, and bit lines BL, /BL, and employs a SESO transistor for a write transistor. The memory illustrated herein is a 3-transistor memory of the type which has a separate write word line WWL and read word line RWL. This is because the separate word lines contribute to a stable operation of the memory. Likewise, there are two separate bit lines BL, /BL for write and read, so that a read operation can be started at the time a storage node SN is stabilized at a write signal level. In other words, a read operation can be performed in the latter half of a write operation, so that a faster access is expected. In this event, while modifications are required in peripheral circuits such as the sense amplifier SAMP for performing the operation as mentioned above, such modifications are omitted in the figure because the operation can be readily accomplished with general modifications to the circuit. Of course, the present invention is not limited to the aforementioned configuration, but may employ a 3-transistor memory of the type which has a single word line used in common as the write word line WWL and read word line RWL. In this event, the commonly used word line can eliminate wiring for one part to reduce the process cost. The input/output bus IOBUS comprises a local input/output bus L10[127:0], and is connected to respective bit line pairs through column switches YS3-YS0 of the sense amplifier unit SA. Here, the column switch YS0 is connected to bit lines BL0, BL4 . . . , and bit lines /BL0, /BL4. Thus, from the address ADD[3:2], one is selected from the column switches YS3-YS0 to select a 128-bit line pair requested from a 512-bit line pair. The sense amplifier unit SA also has a pre-charge circuit PRE and a dummy cell DUM other than the sense amplifier SAMP. A precharge signal PCH and common source signals CSN, CSP are provided for starting the precharge circuit PRE and sense amplifier SAMP, respectively.

Figure 8A:
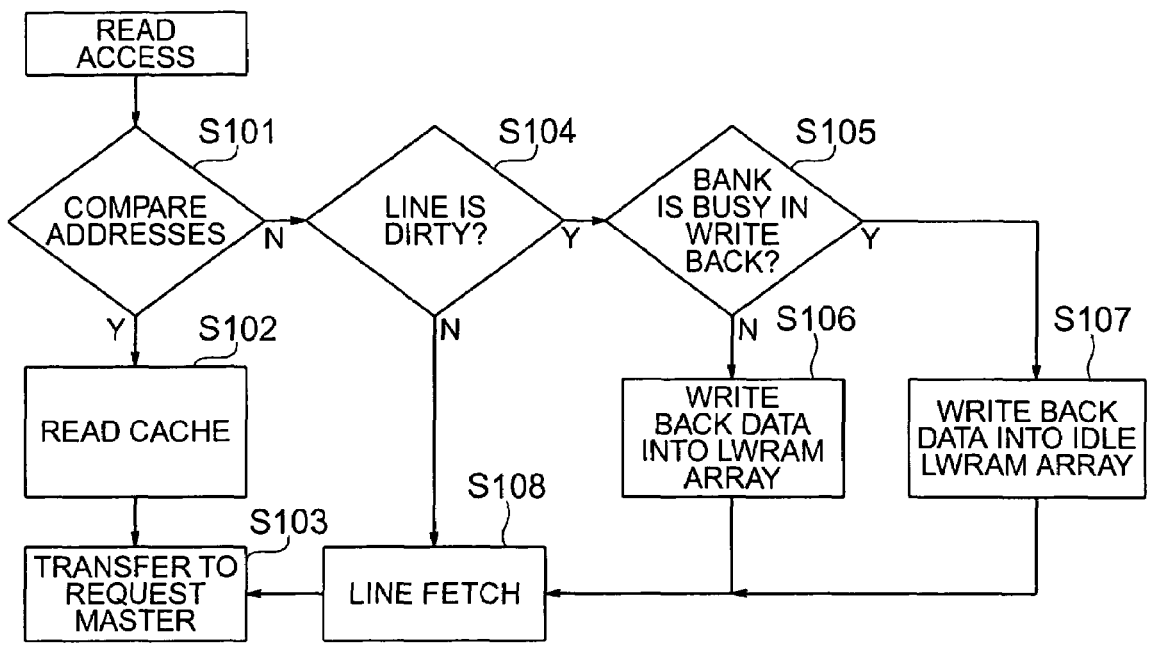
FIGS. 8A and 8B are flow charts illustrating a method of controlling the AF-RAM described in the first embodiment.
Figure 8B:
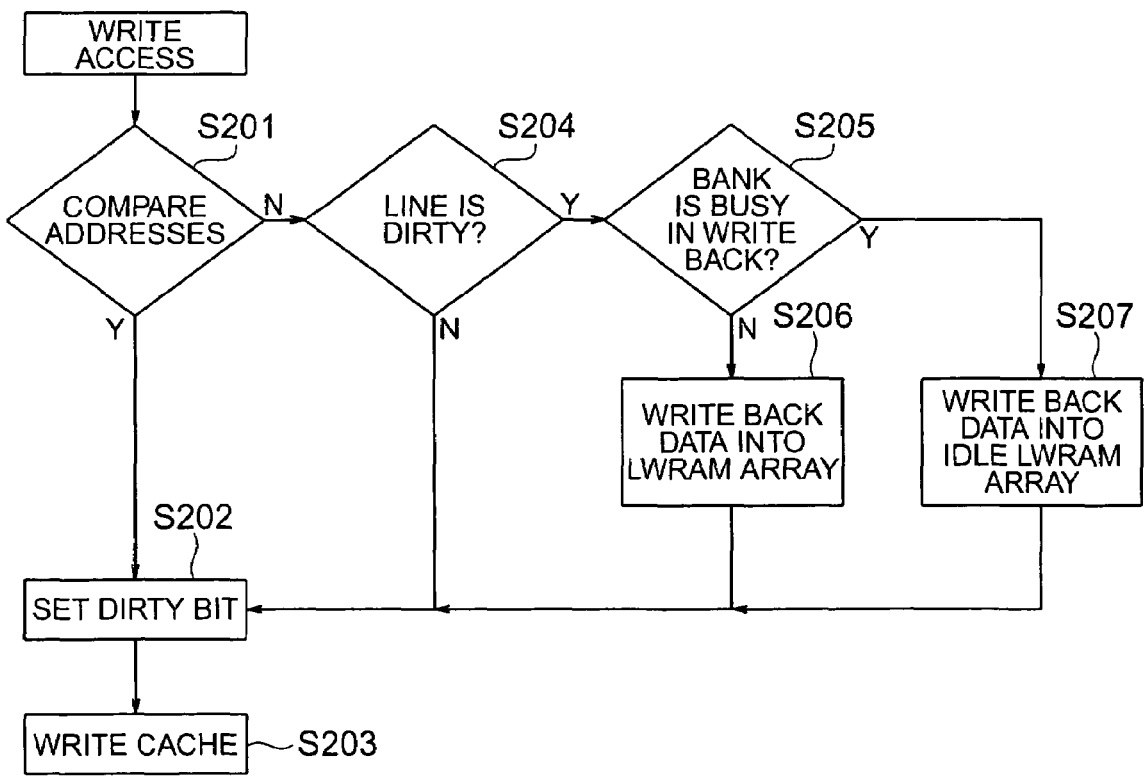

FIGS. 8A, 8B are flow charts for explaining a method of controlling the AF-RAM. Now, operations involved in a read access and a write access will be described in detail with reference to FIGS. 2A to 2D and FIGS. 8A, 8B.

<Read Access Cache Hit>

Figure 2A:
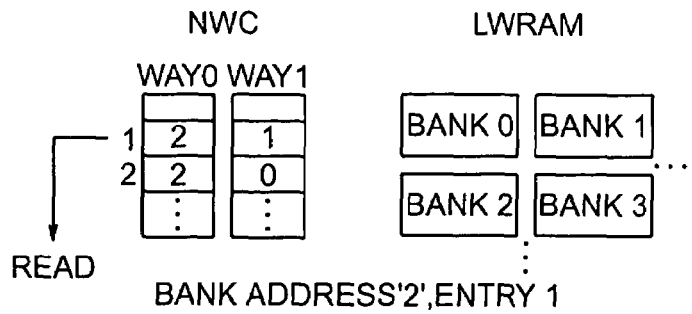
FIGS. 2A, 2B, 2C and 2D are schematic diagrams illustrating an exemplary method of controlling a read operation and a write operation of an access free random access memory (AF-RAM) described in a first embodiment.

Referring first to FIGS. 2A and 8A, a read access made to the AF-RAM will be described in brief. In FIG. 2A, numbers written in the ways indicate bank addresses BankAdd held in the tag TAG in FIGS. 4A, 4B, and numbers written by the side of the way indicate entries in FIG. 4B.

Assume in FIG. 2A that bank address 2 and entry 1 are inputted to in the AF-RAM as an address which is accessed for reading. Then, the inputted bank address is compared with bank addresses held in the ways (step S101). As a result, since corresponding data is held in WAY0, a read access cache hit is found in the cache memory NWC, so that the data is read from the cache memory NWC. Since the cache memory NWC is capable of a high speed operation to read requested data in one clock cycle, a subsequent access to the AF-RAM will not be delayed.

Next, the foregoing operation will be described in greater detail with reference to FIGS. 4A, 4B and 8A. In FIG. 8A, as a read access is requested for the AF-RAM, the memory controller MCTL drives the memory write enable signal MWE# to high. Assume that memory address MAD[16:0] inputted at that time is 0x0081f. In other words, inputted in this event are ADD[16:10]=[0000010], ADD[9:4]=[000001], and ADD[3:2]=[11]

In FIG. 5, as the cache controller CCTL detects a read access, the cache controller CCTL drives the cache write enable signal CWE# to high to read the tag TAG of corresponding data. Since entry is indicated by ADD[9:4]=1 in this event, a tag TAG (0000010) of a cache address array CAA0 and a tag TAG (0000001) of a cache address array CAA1 in FIG. 4A are inputted to the comparator CMP through the tag address buses TADD0, TADD1, respectively, (step S101 in FIG. 8A). The comparator CMP is also applied with ADD [16:10] through the address buffer ADDB, and compares ADD[16:10] with the tag TAG which is the bank address read from each of the cache address arrays CAA0, CAA1. In this event, since the tag TAG of the cache address array CAA0 is equal to the value of ADD[16:10], the comparator CMP drives a hit signal HIT0 to high. On the other hand, the comparator CMP drives a hit signal HIT1 to low because the addresses are different. The cache controller CCTL detects the bit signal HIT0 driven to high, and a corresponding valid bit which is valid, to recognize that requested data is held in WAY0, and drives a hit signal HIT to high. Next, the cache controller CCTL reads corresponding data DATA from the cache data array CDA0, and inputs the read data DATA to the multiplexer MUX through the data bus Da[127:0] (step S102 in FIG. 8A). Since the hit signal HIT has been driven to high, the data bus Da[127:0] from the cache data array CDA0 is selected to transfer the data to a request master, for example, the CPU through the input/output buffer IOBUF and memory data bus MDQ (step S103 in FIG. 8A). By performing the operations associated with a read access cache hit in one clock cycle in the foregoing manner, the resulting data processing system can eliminate a delay in access.

<Read Access Cache Miss>

Figure 2B:
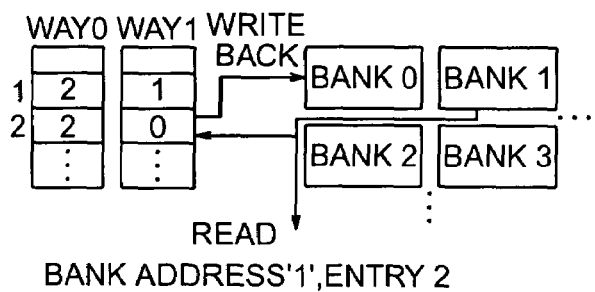

Next, FIG. 2B shows that bank address 1 and the address of entry 2 are inputted to the AF-RAM as a read access address. In this event, no data corresponding to bank address 1 is held in either WAY0 or WAY1. Therefore, requested data is read from bank 1 of the LWRAM. Since the LWRAM is capable of a high speed operation for reading data therefrom, the data can be outputted to the outside in one clock cycle. The data read from bank 1 is also fetched into a line of the cache memory NWC.

When data in the cache memory NWC has been updated, i.e., when the data is dirty, it is necessary to write the data in the cache memory NWC back into bank 0 of the LWRAM prior to the aforementioned line fetch. In this event, since the tag TAG is assigned a bank address, a bank involved in the write-back operation will not be the same bank which is accessed to read requested data. Further, as described later, the cache memory NWC and LWRAM have a data bus for the write-back, and a data bus for a read operation, so that the two operations can be performed simultaneously. Therefore, the read operation can be performed in one clock cycle even in the event of a read access cache miss.

The foregoing operation will be described in greater detail with reference to FIGS. 4A, 4B and 8A. Assume that an address inputted for a read access in FIG. 2B is 0x0042f, i.e., ADD[16:10]=[0000001], ADD[9:4]=[000010], and ADD[3: 2]=[11]. The cache controller CCTL reads corresponding tags TAG (0000010) and TAG (0000000), and determines based on the result of a comparison made by the comparator CMP whether or not a hit is found. In this event, since the addresses do not match, the hit signals HIT0, HIT1 are both driven to low, causing the cache controller CCTL to determine a cache miss. Next, the cache controller CCTL detects dirty bit D[1:0] to determine whether the data has been updated (step S104 in FIG. 8A).

a. When Data is not Dirty:

When not updated, data is read from bank 1 of the LWRAM, and fetched into a line of WAY1 (step S108 in FIG. 8A). In FIG. 5, the cache controller CCTL drives the hit signal HIT to low, and decodes address ADD[16:10] by the bank decoder BANKDEC. In this example, a bank read request signal BRQ[1] is driven to high. Specifically, a bank BANK1 of the LWRAM illustrated in FIG. 6 is selected, and a word line WL2 is selected by ADD[9:4] inputted into the address buffer X-ADB and the word decoder XDEC. Address ADD [3:2] in turn is inputted to the column decoder YDEC to select the column switch YS3. Here, when a SESO memory is used as in FIGS. 7A, 7B, a read word line RWL2 is selected, so that signal corresponding to each storage node SN is outputted to the read bit line RBL. The sense amplifier SAMP, which has been activated by common source signals CSN, CSP, amplifies a small signal difference between a signal outputted from the dummy cell DUM onto the write bit line and the output signal on the read bit line, and outputs the data to local input/output lines L10127-0 through the column switch YS. In this event, 128-bit data on bit lines WBL3, RBL3, WBL7, RBL7, . . . is outputted through the column switch YS3. While no specific description is made on a timing at which the precharge signal PCH is driven, a timing at which the sense amplifier is started, and the like in order to activate the precharge circuit PRE, it should be understood that such timings may be defined in a similar manner to those associated with the operation of a general dynamic memory cell, and no particular limitations are imposed in techniques used therefor.

The data outputted from the bank BANK1 is inputted to the multiplexer MUX and selector SEL shown in FIG. 5 through the input/output buffer INPUT/OUTPUT BUFFER of the LWRAM in FIG. 6, by way of the data bus BDQ[127:0]. Here, since the hit signal HIT has been driven to low due to a cache miss, the multiplexer MUX select the data bus BDQ [127:0] instead of the data bus Da[127:0]. In this way, the data in the bank BANK1 is outputted to the memory data bus MDQ through the input/output buffer IOBUF. On the other hand, the selector SEL is applied with the memory write enable signal MWE#. In this event, the memory write enable signal MWE# has been driven to low to cause the multiplexer MUX to select the data bus DBQ[127:0], so that the data in the bank BANK1 is inputted to the cache data array CDA1 through the data bus Db[127:0]. The cache controller CCTL drives the tag write enable signal TWE# to low, and also drives the cache line enable signal CWE# to low to fetch the data read from the bank BANK1 into a desired location, i.e., a line of WAY1. Thus, the operation is completed when the data is not dirty.

b. When Data is Dirty:

On the other hand, when the data has been updated, it is necessary to output data which should be written back from the cache memory NWC and empty the entry of a location to be accessed before the aforementioned line fetch operation.

The following description is likewise advanced on the assumption that an inputted address is 0x0042f. When corresponding data is updated at step S104 in FIG. 8A, i.e., if the dirty bit D of the entry 2 has been set as in FIG. 4A, data in the cache memory NWC must be written back into the LWRAM for maintaining the data consistency. Next, the cache controller CCTL confirms the state of a bank BANK involved in the write-back. For example, a write-back operation may be still under way in the preceding cycle, thereby preventing an access to a bank address held in WAY0, i.e., the bank BANK2. In such a situation, data is written back to the bank BANK0 indicated by the other bank address held in the two ways WAY0, WAY1 (step S107). The following description will be made on the assumption that both banks BANK0, BANK2 of the LWRAM are idle.

In FIG. 5, a cache miss causes the cache controller CCTL to drive the bank write enable signal BWE# to low and execute a write-back operation. In this event, (0000000) held in the entry 2 of WAY1 is outputted onto the write tag address bus WTADD, and BWQ[0] is driven to high by the bank decoder BANKDEC. In addition, the data is inputted to the LWRAM from the cache data array CDA through the data bus Da[127:0]. Here, the AF-RAM has the data bus Da[127:0] for use in the write-back operation, and the data bus BDQ[127:0] for reading data from the bank and writing the data into the cache memory NWC (line fetch), so that the write-back operation to the bank BANK0 can be performed simultaneously with a data read from the bank BANK1. A timing at which each signal is written into the bank is basically similar to that associated with a read operation, and a variety of signals may be applied as suitable for writing data, so that detailed description thereon is omitted. Thus, the operation is completed when the data is dirty.

As will be understood from the foregoing description, data can be read in one clock cycle even in the event of a read access cache miss irrespective of whether the data is dirty or not, enabling the data processing system to eliminate a delay in access.

<Write Access Cache Hit>

Figure 2C:
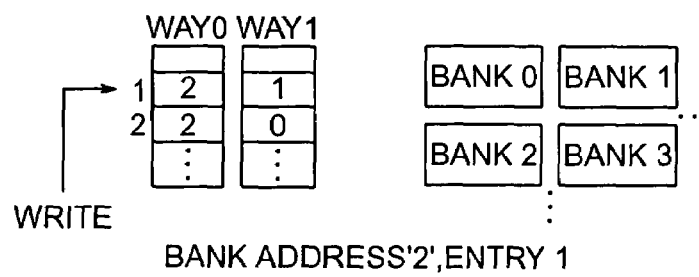

Next, FIG. 2C shows that bank address 2 and the address of entry 1 are inputted into the AF-RAM as a write access address. In this event, since data corresponding to the write access is held in WAY0, a write access cache hit is found, causing the data to be written into the way WAY0 of the cache memory NWC. Since the cache memory NWC is capable of a high speed operation to write data in one clock cycle, a subsequent access to the AF-RAM will not be delayed. Thus, the operation is completed when a write access cache hit is found.

The foregoing operation will be described in greater detail with reference to FIGS. 4A, 4B and 8B. Assume that a memory address MAD inputted for a write access in FIG. 2C is 0x0081f, i.e., ADD[16:10]=[0000001]. ADD[9:4]= [000010], and ADD[3:2]=[11] are inputted. Since an address comparison at step S201 in FIG. 8B is similar to that in a read access, description thereon is omitted. In this event, since the tag TAG of the cache address array CAA0 is equal to the value of ADD[9:4], i.e., corresponding data is held in WAY0, the cache controller CCTL determines a cache hit, and drives the cache write enable signal CWE# to low. The cache controller CCTL also sets a dirty bit D[0] (step S202). The write data is also inputted to the input/output buffer IOBUF from the memory data bus MDQ, and then inputted to the selector SEL through the data bus EDQ[127:0]. In this event, since the memory write enable signal MWE# has been driven to low, the data bus EDQ[127:0] is selected, so that the data is inputted to the cache memory NWC through the data bus Db[127: 0] and written into a desired location (step S203). The cache memory NWC is capable of a high speed operation to write data thereinto. Consequently, since the data can be written into the AF-RAM in one clock cycle, an external access will not be delayed. The foregoing description has been made on the operations involved in the write access cache hit.

<Write Access Cache Miss>

Figure 2D:
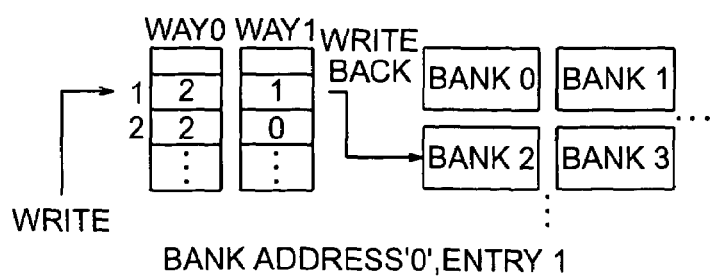

Next, FIG. 2D shows that bank address 0 and the address of entry 1 are inputted to the AF-RAM as a write access address. In this event, since no data corresponding to bank address 0 is held in either WAY0 or WAY1, a write access cache miss is found in the cache memory NWC. Here, when a write access is concerned, the data is written into the cache memory NWC irrespective of whether a hit or a miss is found. Due to a low write speed of the LWRAM, if the same address is accessed in succession for writing to cause successive write operations to the LWRAM, a subsequent access will be delayed. When data in the cache memory NWC has been updated, it is necessary to write the data back to the LWRAM prior to a write access to the cache memory NWC. FIG. 2D shows that data in WAY0 is written back to the bank BANK2 before external data is written into entry 1 of WAY0. In this way, no external write access will be delayed.

The foregoing operation will be described in greater detail with reference to FIGS. 4A, 4B and 8B. Assume that an address inputted for a write access in FIG. 2D is 0x0001f, i.e., ADD[16:10]=[0000000], ADD[9:4]=[000001], and ADD[3:2]=[11]. Since an address comparison is the same as that described above, description thereon is omitted here. When data in entry 1 is not dirty in either WAY0 or WAY1 (step S204), external data is written into one of the ways, here, WAY0 (steps S202, S203). The foregoing operation associated with a line in entry 1 not dirty is similar to that which is performed in the event of a write access cache hit, so that detailed description thereon is omitted.

Next, assume that data in entry 1 is dirty both in WAY0 and WAY1, as illustrated in FIG. 4A. In this event, data held in corresponding area must be written back to the LWRAM before external data is written into the cache memory NWC. To carry out this operation, the cache controller CCTL monitors the state of a bank BANK involved in a write-back at step S205 in FIG. 8B simultaneously with a read access cache miss. For example, when the bank BANK1 is busy in a write operation so that data in WAY1 cannot be written back thereto, the data is written back to the bank BANK2 indicated by a bank address in WAY0. The following description will be made on the assumption that data is written back to an idle bank BANK at step S206 in FIG. 8B.

A write access cache miss causes the cache controller CCTL to drive the bank write enable signal BWE# to low and perform a write-back operation. In this event, (0000010) held in entry 1 of WAY0 is outputted to the write tag address bus WTADD, and BWQ[2] is driven to high by the bank decoder BANKDEC. Also, data is inputted to the LWRAM from the cache data array CDA0 through the data bus Da[127:0]. Subsequently, write data is inputted from the memory data bus MDQ to the input/output buffer IOBUF, and then inputted to the selector SEL through the data bus EDQ[127:0]. In this event, since the memory write enable signal MWE# has been driven to low, the data bus EDQ[127:0] is selected, so that the data is inputted to the cache memory NWC through the data bus Db[127:0] and written into a desired location (step S203). These operations described above are performed in one clock cycle. Such a control strategy permits the data processing system to eliminate a delay in access to the AF-RAM.

Next, description will be made for a situation in which write access cache misses are found in succession. In this event, the write-back operations must be occasionally performed in succession, in which case the cache memory NWC and AF-RAM may be controlled as described in FIGS. 3A to 3D.

Figure 3A:
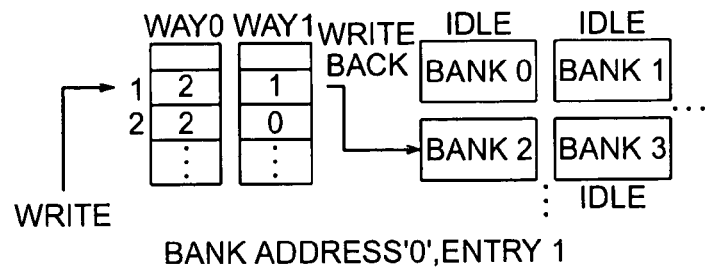
FIGS. 3A, 3B, 3C and 3D are schematic diagrams illustrating an exemplary method of controlling a write operation of the AF-RAM described in the first embodiment.
Figure 3B:
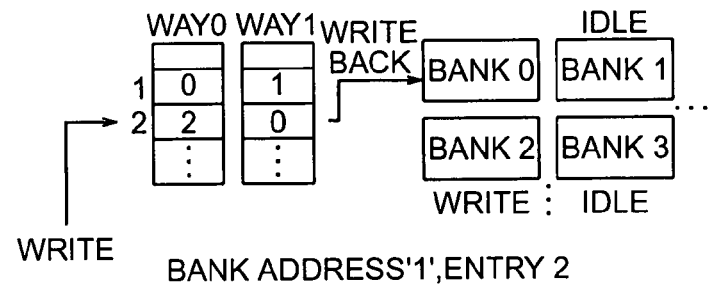
Figure 3C:
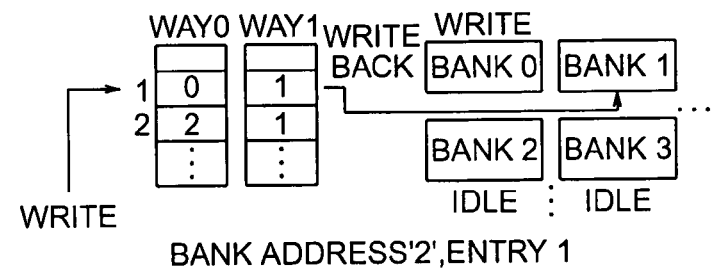
Figure 3D:
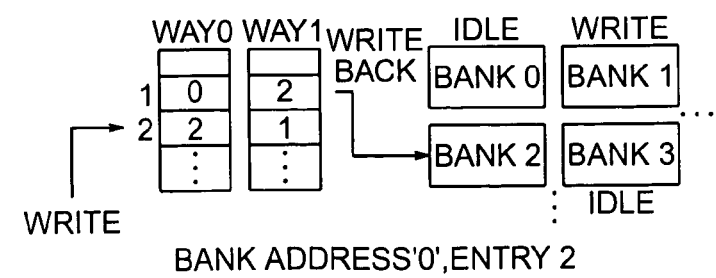

First, FIG. 3A shows that bank address 0 and entry 1 are inputted to the AF-RAM from the outside as a write access address in cycle Cycle#1. In this event, a write access cache miss is found in the cache memory NWC because no corresponding data is held in either WAY0 or WAY1. Further, assuming that data in WAY0 has been updated, data in the bank BANK0 is written into WAY0 after the data in WAY0 is written back to the bank BANK2. Next, when bank address 1 and entry 2 are inputted to the AF-RAM as a write access address in the following cycle Cycle#2, the cache memory NWC and AF-RAM are controlled in the following manner. As illustrated in FIG. 3B, data at bank address 1 is not held in the way corresponding to entry 2. Therefore, if data have been updated both in WAY0 and WAY1 and therefore are dirty, data in one of these ways must be written back. However, the bank BANK2 is busy in a write operation caused by the write-back operation in the preceding cycle Cycle#1, so that the data in WAY0 of entry 2 cannot be written back to the bank BANK2. Thus, instead of writing back data in WAY0, data held in WAY1 is written back to the bank BANK0. In this way, even when the same bank is accessed in succession for writing, subsequent accesses will not be delayed. Likewise, assume that bank address 2 and entry 1 are inputted to the AF-RAM as a write access address in cycle Cycle#3. In this event, assume that no corresponding data is held in either WAY0 or WAY1, and data in these ways are dirty. In this event, after data held in WAY1 is written back to the bank BANK1, data corresponding to the bank BANK2 is written into WAY0. Likewise, assume that bank address 0 and entry 2 are inputted to the AF-RAM as a write access address in cycle Cycle#4. Assume also that requested data in the bank BANK2 is not held in either WAY0 or WAY1, and data in these ways are dirty. In this event, since the bank BANK1 is also busy in a write operation, data held in WAY0 is written back to the bank BANK2, and then data corresponding to the bank BANK0 is written into WAY0.

FIG. 9 is a timing chart representing successive write operations as described above, showing that a slow write operation of the LWRAM is concealed. In cycles Cycle#1 to #3, a write access cache miss is found, and bank write request signals BWQ[2], BWQ[0], BWQ[1] are driven in the respective cycles. However, as previously described, the method of controlling the AF-RAM according to the present invention may be applied to eliminate a write-back operation which would otherwise be required for a bank that is still busy in a write operation started in the preceding cycle. Stated another way, the data processing system can eliminate a delay in external access.

Next, description will be made on problems caused by a write access cache miss and a read access in the following cycle, as well as on solutions for the problems.

Referring to FIG. 3A, ADD[16:10]=[0000000], ADD[9:4]= [000001], and ADD[3:2]=[11] are inputted to the AF-RAM, and a write access cache miss is found in the cache memory NWC, so that a write-back operation is performed for the bank BANK2, and external data corresponding to bank address 0 is written into WAY0. Assume herein that a read access is requested in the following cycle Cycle#2 with input addresses ADD[16:10]=[0000010], ADD[9:4]=[000001], and ADD[3:2,]=[11]. In this event, data corresponding to bank address 2 is not held either in WAY0 or in WAY1, resulting in a read access cache miss. Therefore, the requested data must be read from the bank BANK2, however, the bank BANK2 is still busy in executing a write-back operation started in cycle Cycle#1, so that the bank BANK2 cannot be accessed for a read in cycle Cycle#2. To solve this problem, the present invention employs a forward buffer FWB as illustrated in FIG. 10.

FIG. 10 is a block diagram illustrating the AF-RAM of FIG. 5 which is additionally provided with the forward buffer FWB. The forward buffer FWB is added for temporarily holding data to be written back, resulting from a write access cache miss. Specifically, in an access pattern as described above, even with a read access cache miss, data can be outputted to the outside without delay if the data is read from the forward buffer FWB rather than from the bank BANK2 which should be essentially accessed. Also, in the event of a write-back operation, data of one word line WL1 may be read from a corresponding bank, for example, the bank BANK2, and written into the forward buffer FWB together with the data to be written back. In this event, even if the address of the word selector WS changes in the foregoing read access, the data can be read from the forward buffer FWB because this is an access within one row (page). It should be noted that while a circuit is required for reading data of one word line from the LWRAM, such a circuit can be readily implemented using general circuit techniques, so that the circuit is omitted in FIG. 10.

In the embodiment described above, the write cycle (m) is longer than the read cycle (n) with the ratio (m/n) being equal to two, and the cache memory NWC is provided with two ways. When the present invention is generalized in a data processing system which uses memory cells that present a slow write speed, the data processing system will have a cache memory which is provided with a number of ways equal to the ratio (m/n) of the write cycle (m) to the read cycle (n) of the memory cells.

Since the number of ways indicates the number of a plurality of sets included in a cache memory, it can only take an integer value. On the other hand, a write/read cycle can be defined by a cycle time which spans from the time an access is started to the time the access is completed. In this event, the ratio (m/n) of the write cycle (m) to the read cycle (n) tends to take a value which is not an integer. When the ratio m/n actually takes a value in a range of 1.1 to 2.0, the number of ways is set to two. Also, when the ratio m/n takes a value in a range of 2.1 to 3.0, the number of ways is set to three. Stated another way, when the ratio m/n takes an integer value such as two or three, the number of ways is determined to be this integer value. However, when the ratio m/n takes a value which has a fractional portion, the number of ways is determined to be a value derived by rounding up the fractional portion. Nevertheless, when the write/read cycle is defined by an integer ratio of one cycle of a reference clock as in a synchronous memory, the ratio (m/n) always takes an integer value, so that the number of ways can be determined in a simple manner.

The number of ways determined by the ratio (m/n) in the foregoing manner presents an optimal value which minimizes the capacity of the cache memory NWC. Therefore, as long as the capacity of the cache memory NWC does not constitute a penalty for the area of the entire chip, the number of ways may be larger than the value determined by the ratio (m/n), with the advantages of the present invention still left effective. Further, the number of ways larger than the minimum value is also advantageous because the extra ways can serve to ensure a timing margin for successive cache misses.

The cache controller CCTL further controls the cache memory such that a write-back operation is not performed in succession to the same one of memory banks comprised of the aforementioned memory cells, with the result that the data processing system can solve the problem inherent to the LWRAM which is slow in writing, and eliminate a delay in access to the AF-RAM.

The AF-RAM of the present invention is not limited to the specific values chosen to the memory capacity thereof, the capacity of the cache memory NWC, the number of banks in the LWRAM, and the like, as described in the foregoing embodiment. For example, one way of the cache memory NWC has been shown to have a capacity of one bank for simplicity, but one way may have a capacity of one bank or more, as a matter of course. Actually, the memory capacity does not completely match in many cases due to the redundancy of the memory and the like. Further, while FIG. 6 describes the word decoder XDEC and the like for each bank, they may be shared by adjacent banks to reduce the area for peripheral circuits. It should be also understood that the configuration of the sense amplifier SAMP and precharge circuit PRE can be modified in various ways without departing from the spirit and scope of the present invention.

Second Embodiment

Figure 11:
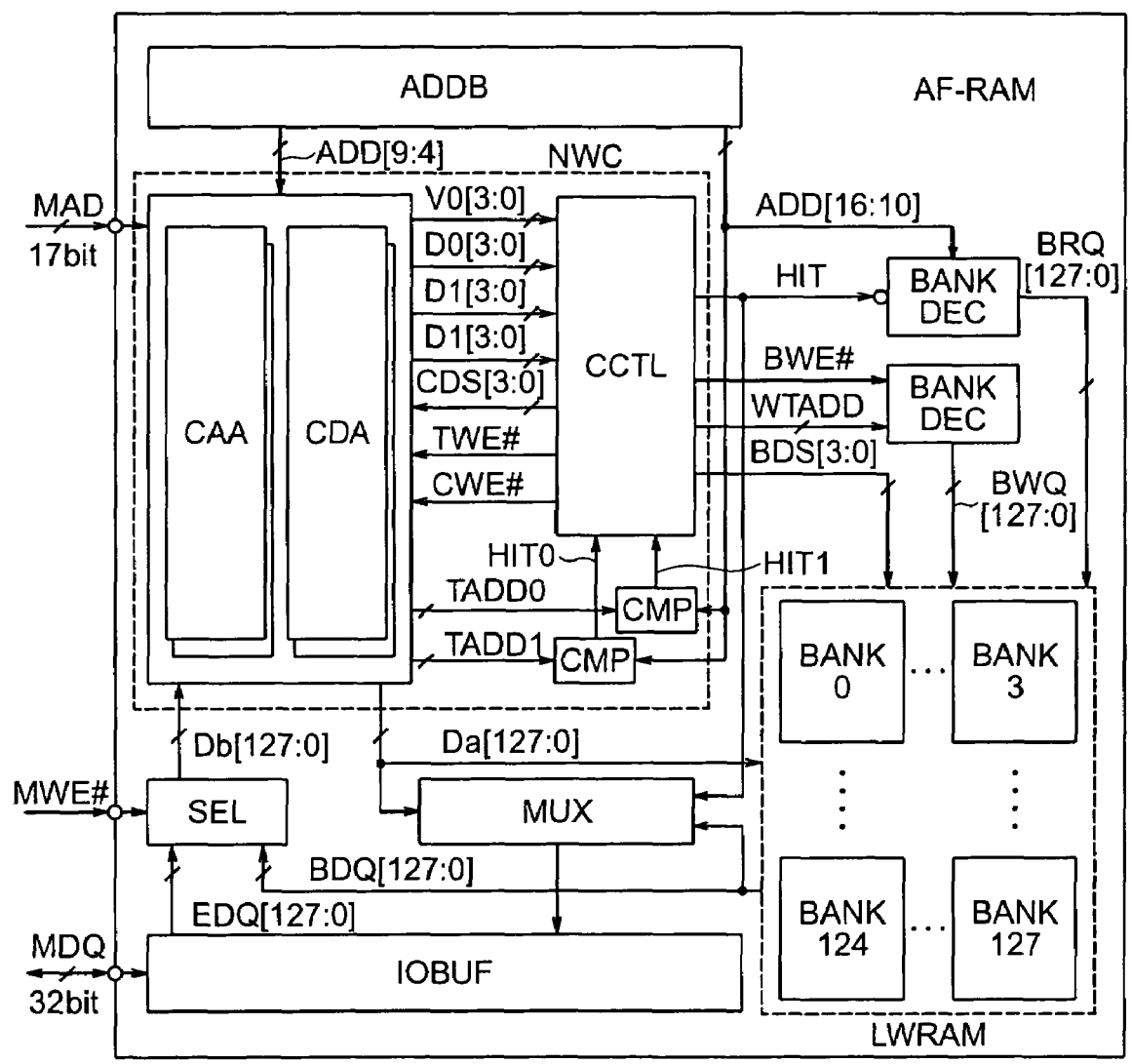
FIG. 11 is a block diagram illustrating a second embodiment of the AF-RAM appearing in FIG. 1.
Figure 13:
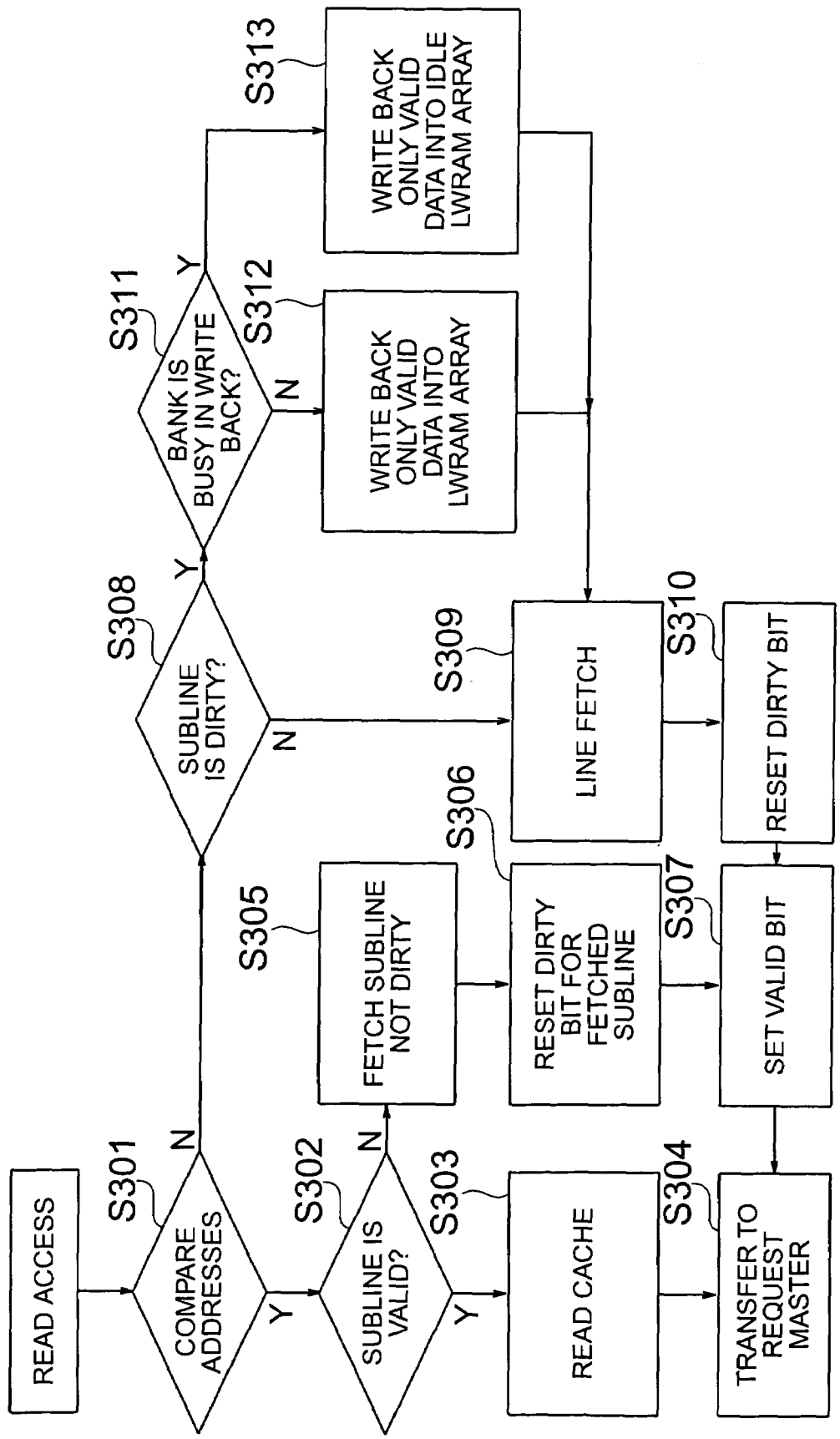
FIG. 13 is a flow chart for explaining a read operation of the AF-RAM illustrated in FIG. 11.
Figure 14:
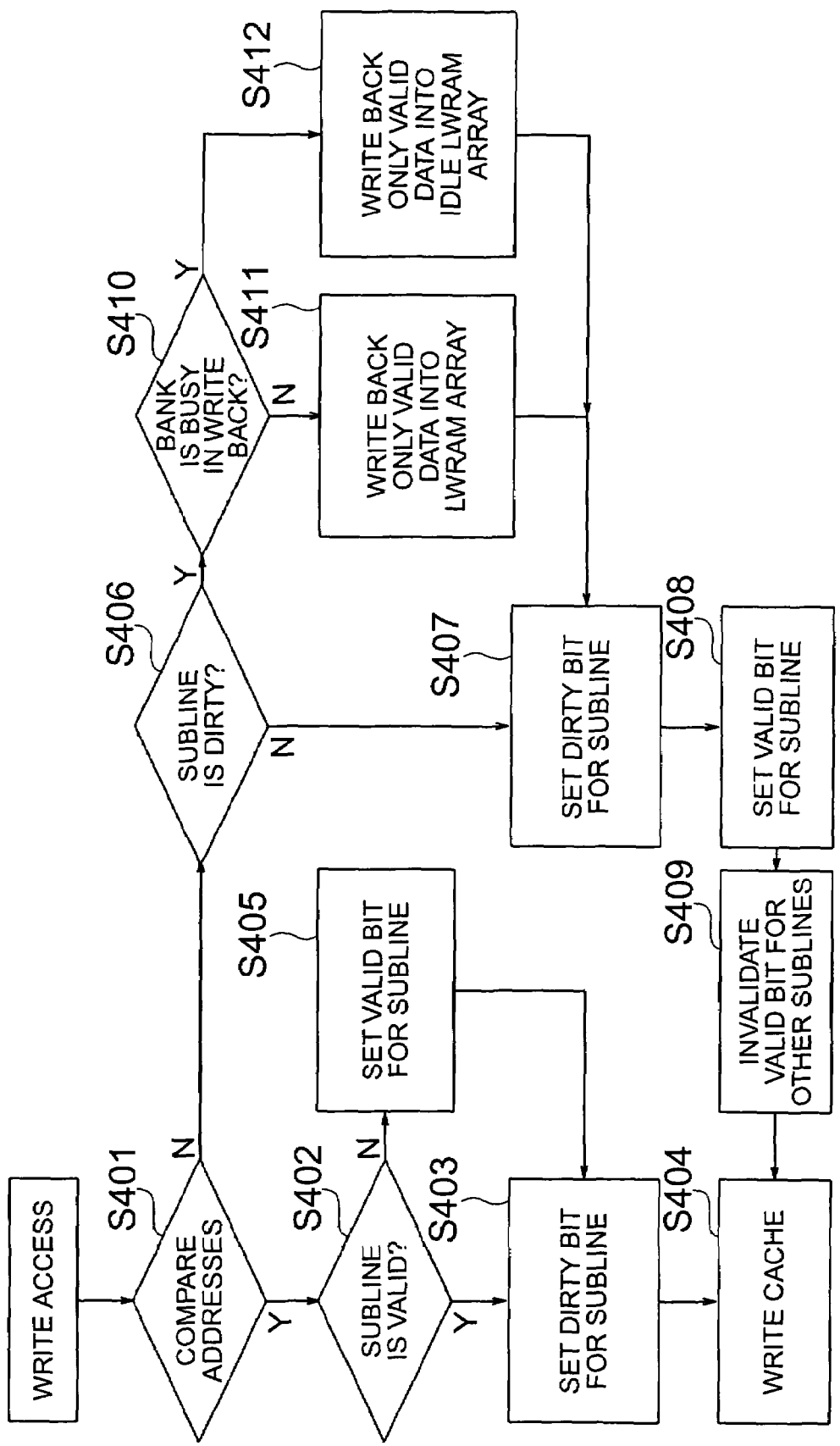
FIG. 14 is a flow chart for explaining a write operation of the AF-RAM illustrated in FIG. 11.

FIG. 11 illustrates a second embodiment of the AF-RAM according to the present invention. The second embodiment differs from the first embodiment in the widths of the data buses Da[127:0] and Db[127:0] internal to the AF-RAM and the memory data bus MDQ external to the AF-RAM. Control signals added or modified by employing the buses of different widths include a cache data select signal CDS[3:0], a bank data select signal BDS[3:0], valid bits V0[3:0], V1[3:0], and dirty bits D0[3:0], D1[3:0]. FIG. 12 illustrates a specific example of the cache memory NWC implemented in FIG. 11. The cache memory illustrated in FIG. 12 differs from that in FIG. 4A in that each cache line is divided into sublines each having the bus width of the memory data bus MDQ, and that each of DATA[3]-DATA[0] is provided with a valid bit and a dirty bit. The cache line is divided into the sublines in the foregoing manner for management in order to solve the following problems.

Consider for example a situation in which a write access is requested to the AF-RAM from the outside, but corresponding data is not held in the cache memory NWC, thereby resulting in a write access cache miss. In this event, 32-bit data from the outside is written into DATA[3] of a certain entry, but data in the remaining DATA[2]-DATA[0] must be read from corresponding banks for maintaining the data consistency in the entries. This read operation is not needed in the first embodiment in which the memory data bus MDQ is equal in line width to the cache memory NWC, but in the second embodiment, this read operation may have to be performed from a bank which is busy in a write operation as the case may be. However, stated in an opposite way, omission of the read operation for the data consistency within the line can result in the data processing system which can eliminate a delay in access by a similar control method to the first embodiment, even with a memory which is slow in a write operation. In other words, the cache line is divided into sublines in the second embodiment for purposes of omitting the read operation (allocation) which has been needed before, while maintaining the data consistency within the cache line, and concealing a delay in a write operation.

In the following, the second embodiment will be described with reference to FIGS. 11 to 16.

<Read Access Cache Hit>

First, when a read access is requested to the AF-RAM, and the result of an address comparison (step S301 in FIG. 13) shows that requested data is held in the cache memory NWC, the data is read from the cache memory NWC in a manner similar to the first embodiment (steps S302-S304). Consequently, the data processing system is free from a delay in access to the AF-RAM. Since the operations involved in this scenario is identical to those in the first embodiment, description thereon is omitted.

<Read Access Cache Miss> a. When Addresses Match:

Description will be next made on a situation in which the result of the address comparison shows that the values of addresses match, but a valid bit has been reset for corresponding data (step S302, S305). Assume, for example, that data has been held in the cache memory NWC as illustrated in FIG. 12. Data with reset valid bit is indicated by a shaded data field. Assuming herein that ADD[16:10]=[0000010], AD[9:4]=[000010], and ADD[3:2]=[00] are inputted to the AF-RAM, this is equal to a bank address in a tag TAG of WAY0. However, since the valid bit V0[0] is reset for DATA[0] which is to be read, valid data must be read from the bank BANK2 of the LWRAM. Therefore, data from the bank BANK2 of the LWRAM is inputted to entry 2 of the cache data array CDA0 through the bank data bus BDQ[127:0]. Here, since the dirty bit is set for DATA[L]-DATA[3] of the cache data array CDA0, data from the bank BANK2 must not be fetched into a line of the cache memory NWC. This is because data N, O, P in the cache data array CDA0 are the most recent data, and these data would be destructed if obsolete data in the bank BANK2 were written into the cache data array CDA0. To obviate this trouble, the cache data select signal CDS[3:0] is used. The cache data select signal CDS[3:0] represents an inverse of the result of logical AND taken for the valid bit with the dirty bit. In this event, since the valid bits of the cache address array CAA0 are V0[3:0]=(0111), and the dirty bits are D0[3:0]=(0111), bit-by-bit logical AND of the valid bits with the dirty bits results in (0111), which is then inverted to (1000). The cache controller CCTL selects a subline for a line fetch based on such control. In this event, the subline DATA[0] of entry 2 of WAY0 alone is fetched into a line of the cache memory NWC under control of the controller CCTL. In this way, data will not be destructed within lines of the cache. It is therefore possible to conceal a delay in access caused by a slow write operation.

b. When Addresses do not Match:

Next, description will be made on a situation in which addresses do not match at step S301. The address comparison is followed by a confirmation which is made to see whether data in an entry to be accessed is dirty (step S308 in FIG. 13). If there is no dirty data in the entry to be accessed, data may be read from a bank BANK indicated by the inputted address, followed by execution of a line fetch (S309-S304). Consequently, the data processing system can eliminate a delay in access to the AF-RAM. Since the operations involved in this scenario are similar to those described in connection with steps S104, S108, S103 in FIG. 8A, detailed description thereon is omitted here.

Next, when the dirty bit is set for the entry to be accessed, the data must be written back to an associated bank of the LWRAM. In this event, data in a subline, the valid bit of which is reset, must not be written back. This is because the data is invalid, and would destruct data which should be essentially held. Assume, for example, that ADD[16:10]=[0000001], ADD[9:4]=[000010], and ADD[3:2]=[00] are inputted from the outside in the state illustrated in FIG. 12. Since data at bank address 1 is not held either in WAY0 or in WAY1, data in one of the ways must be written back to an associated bank. Assume herein that the bank BANK0 is busy in a write-back operation at step S311, so that data in WAY1 cannot be written back to the bank BANK0. In this event, data held in WAY0 may be written back to the bank BANK2 of the LWRAM. Here, since the valid bit V0[0] is reset for entry 2 of the way WAY0, DATA[0] must not be written back. The bank data select signal BDS[3:0] is utilized as a control signal for preventing the write-back. The bank data select signal BDS[3:0] represents the result of logical AND taken for valid bits with dirty bits provided for an entry to be accessed. Specifically, since the valid bits of the entry 2 of WAY0 are V0[3:0]=(0111), and the dirty bits are D0[3:0]=(0111), a logical AND operation of the valid bits with the dirty bits results in (0111) which is then based on to write back N, O, P of data DATA[1]-DATA[3] of entry 2 (step S313). The operations involved in the subsequent steps S309, S310, S307, S304 are similar to those described in connection with FIGS. 4A, 4B, so that detailed description thereon is omitted here. The foregoing description has been made on the control method in a read access. With the foregoing control, the resulting data processing system can eliminate a delay in access even if it employs a memory which is slow in a write operation, when the data bus MDQ, which is an external bus, is different in bus width from the internal data bus Da[127:0] and the like of the AF-RAM.

<Write Access Cache Hit>

Next, description will be made on a write access requested to the AF-RAM. The addresses are compared at step S401 in FIG. 14, and the compared addresses are assumed to match with each other. Then, a valid bit associated with an entry to be accessed is referenced at step S402. Here, if the valid bit is set, the dirty bit associated with a subline to be accessed is set, and data is written into the cache memory NWC (steps S403, S404). Similarly, when the valid bit associated with the subline of an entry to be accessed has been reset at step S402, a cache hit is determined, and external data is written into a desired area. In this event, the valid bit is set, followed by execution of the operations at steps S403, S404. The foregoing operations are involved in a write access cache hit. Consequently, the data processing system can eliminate a delay in access to the AF-RAM. Since the write access cache hit in the second embodiment is basically similar to the counterpart in the first embodiment, detailed description thereon is omitted here.

<Write Access Cache Miss>

Next, description will be made on a situation in which requested data is not held in an entry to be accessed, as shown by the result of an address comparison made at step S401, so that a write access cache miss is determined.

When a write access cache miss is found, it is first determined whether or not dirty data is held in an entry to be accessed (step S406). Here, if there is no dirty data, a dirty bit and a valid bit are set for data corresponding to an address at which data is written (steps S407, S408). Further, data other than a subline corresponding to the data to be written is invalidated. Assume, for example, ADD[16:10]=[0000000], AD[9:4]=[000010], and ADD[3:2]=[00] are inputted to the AF-RAM from the outside. In this event, since no data is held in the cache memory NWC in FIG. 12, a write access cache miss is found, causing the cache controller CCTL to write external data into entry 2 of WAY1. Further, the cache controller CCTL resets the associated valid bit in order to invalidate data in DATA[1]-DATA[3]. By doing in the foregoing manner, a read operation from the LWRAM can be eliminated, while maintaining the data consistency within the entry in the event of a write access cache miss. Also, if dirty data is held in the entry at step S406, a flow of steps S410, S411, S412 is executed as described in FIG. 14. This flow may write back only valid data having a set valid data, using the bank data select signal BDS[3:0], in a manner similar to steps S311, S312, S313 in FIG. 13.

Figure 15:
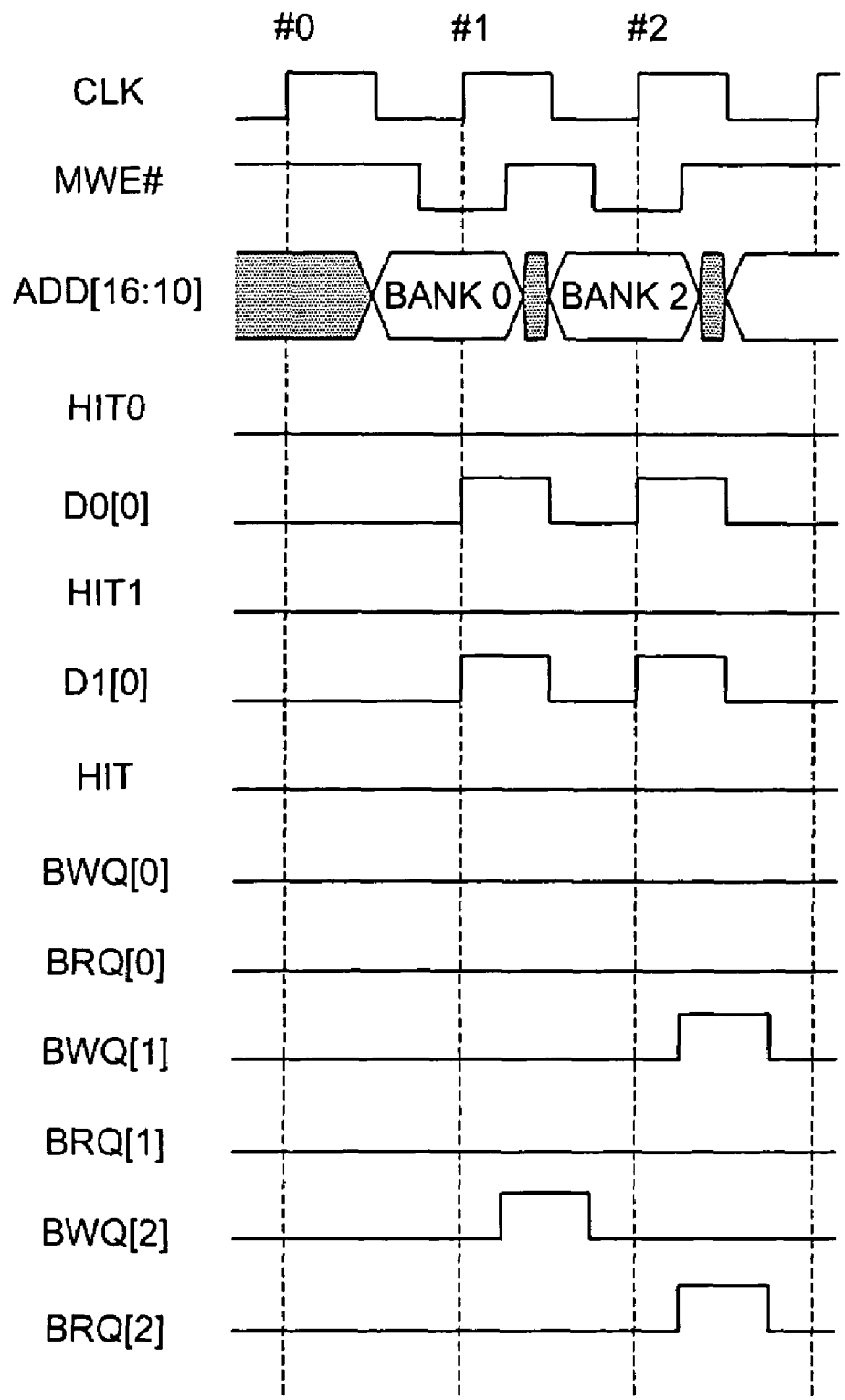
FIG. 15 is a timing chart for explaining a problem of the AF-RAM illustrated in FIG. 11.
Figure 16:
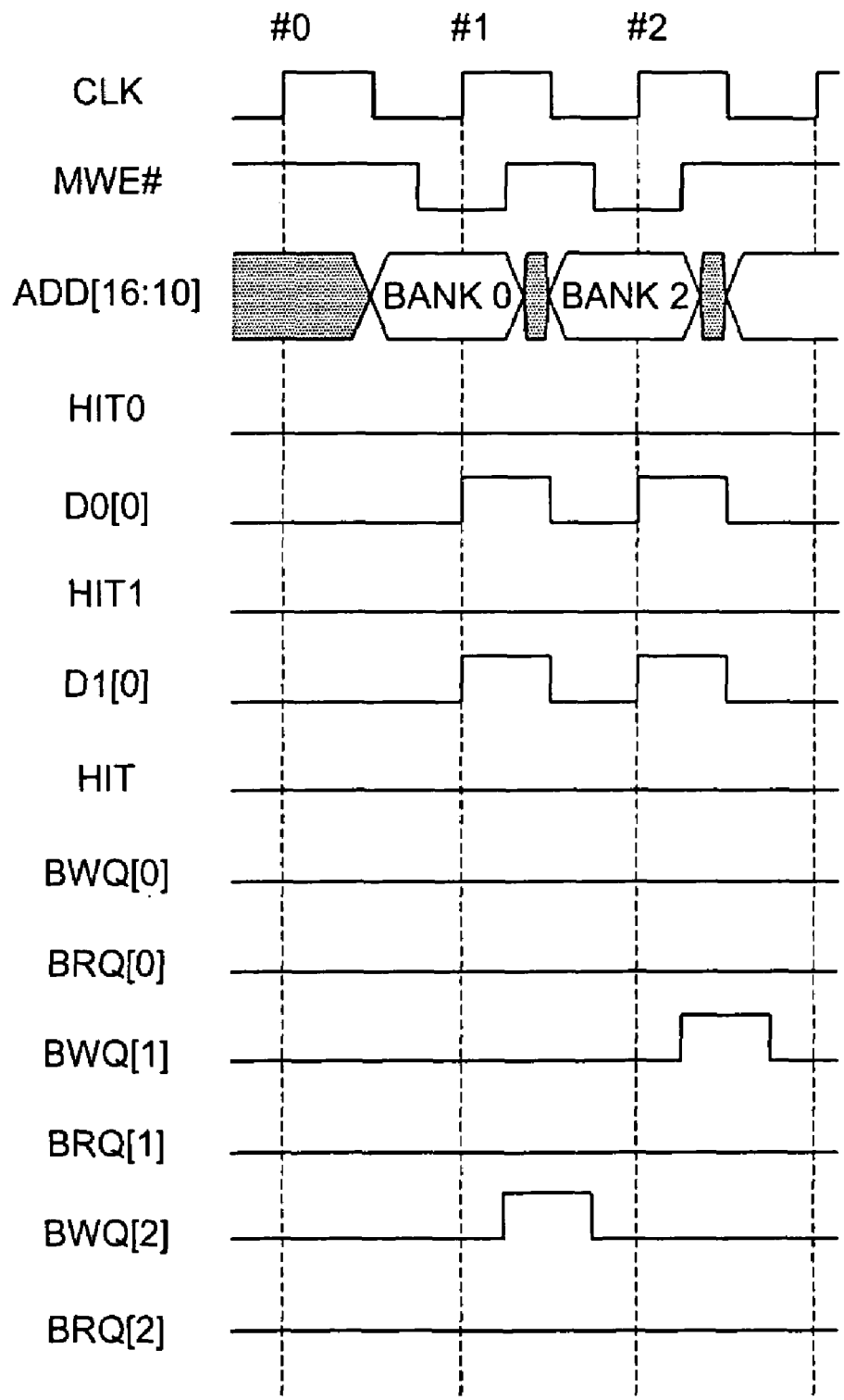
FIG. 16 is a timing chart showing that the problem is solved for the AF-RAM illustrated in FIG. 11.

FIG. 15 is a timing chart for explaining a problem that the aforementioned write-back operation of the LWRAM collides with a read operation from the LWRAM, when data is not managed in units of sublines. FIG. 16 in turn is a timing chart which shows that the problem is solved using the technique described above. Assume that ADD[16:10]= [0000000], ADD[9:4]=[000001], and ADD[3:2]=[00] are inputted to the AF-RAM from the outside in cycle Cycle#1, and ADD[16:10]=[0000010], ADD[9:4]=[000001], and ADD[3:2]=[00] are inputted in cycle Cycle#2. In other words, FIG. 15 shows that a write access cache miss is found both in cycles Cycle#1 and Cycle #2, so that data in the bank BANK2 held in WAY0 and data in the bank BANK1 held in WAY1 are written back in the cycles Cycle#1, Cycle#2, respectively. When the technique of the present invention is not employed, a write-back operation is performed to the bank BANK2 in the cycle Cycle#1 as shown in FIG. 15, and therefore a write operation continues until the cycle Cycle#2. Also, as described above, when an address of the bank BANK2 which is accessed for writing is inputted in the cycle Cycle#2, data must be read from the bank BANK2 for maintaining the data consistency of entry 1. However, the write operation started in the preceding cycle is still under way, and will collide with a read operation from the bank BANK2.

In contrast, when data is managed in units of the data bus width of an external data bus, here, the memory data bus MDQ as in the present invention, the foregoing allocate operation from the LWRAM is not needed in the event of a write access cache miss. Therefore, as illustrated in FIG. 16, no read operation is performed from the bank BANK2 in the cycle Cycle#2, thereby avoiding a collision with an access.

As will be understood from the foregoing description, even if the memory data bus MDQ is different in bus width from the internal data bus of the AF-RAM, for example, Da[127:0] or Db[127:0], the control method of the present invention can solve the problem inherent to the LWRAM which is slow in writing, thus enabling the data processing system to eliminate a delay in any access to the AF-RAM. While the foregoing embodiment has been described in connection with a memory data bus MDQ which has a bus width of 32 bits, the present invention is not limited to this particular bus width, as a matter of course. When data is managed for each subline, the cache line can be divided into a larger number of sublines. Further, while the number of banks in the LWRAM, the capacity of the cache memory NWC, i.e., the number of ways are indicated by the ratio (m/n) of the write cycle (m) to the read cycle (n), there may be a number of banks and ways equal to or larger than (m/n), as a matter of course. Further, one way may have a capacity larger than the capacity of one bank in the LWRAM. It should be understood that the present invention can be modified in various manners without departing from the spirit and scope of the invention, as is the case with the aforementioned first embodiment.

Third Embodiment

While the foregoing embodiments have shown examples in which a SESO memory is used in the LWRAM to implement the AF-RAM, a non-volatile phase change memory may be used for the LWRAM.

Figure 17:
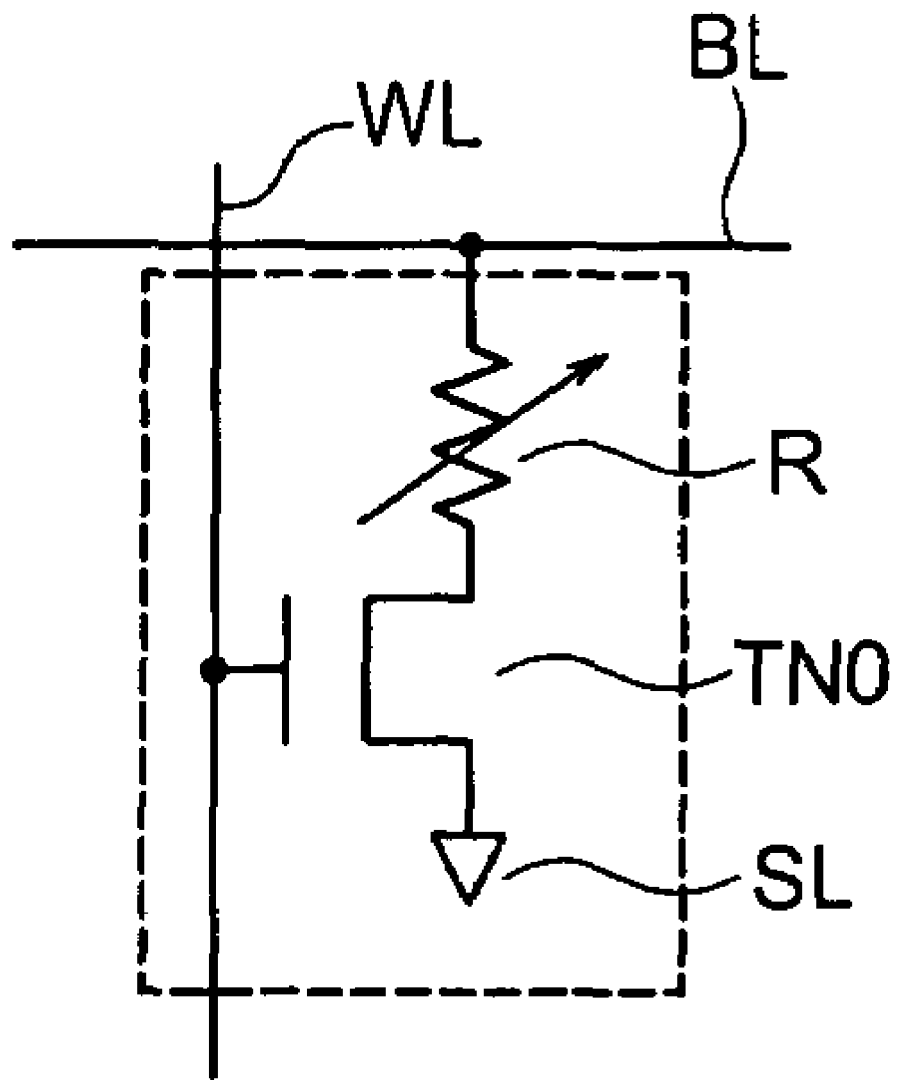
FIG. 17 is a circuit diagram illustrating an embodiment of a phase change memory implemented in LWRAM appearing in FIG. 6.

FIG. 17 is a circuit diagram illustrating a phase change memory cell MC which is employed in the LWRAM of FIG. 6. The phase change memory cell MC comprises a word line WL, a bit line BL, and a variable resistive element R. As with the SESO memory, the phase change memory also has a problem that a write speed is lower than a read speed. However, the problem of a low write speed can be solved by using the techniques described in the foregoing first and second embodiments even when the phase change memory cell MC is employed. Thus, it should be understood that the resulting data processing system can eliminate a delay in any access to the AF-RAM. Advantageously, the phase change memory cell MC has a smaller memory cell area than the SESO memory, so that a memory comprised of phase change memory cells MC can provide a larger data storage capacity at a lower cost than the SESO memory. Also, since the phase change memory is non-volatile, a current required for holding data therein can be reduced. Further, while FIG. 17 illustrates the memory cell configuration which has the variable resistive element R positioned between the bit line BL and an access transistor TN0, the present invention is not limited to this particular configuration, but a variety of modifications may be made thereto, for example, the variable resistive element R may be positioned between a source line SL and the access transistor TN0.

Fourth Embodiment

While the first, second and third embodiments have shown exemplary AF-RAMs which are implemented using the SESO memory or phase change memory for the LWRAM, a high performance AF-RAM can be provided by applying a non-volatile ferroelectric random access memory (hereinafter referred to as the "FeRAM") and using the techniques of the present invention.

Figure 18A:
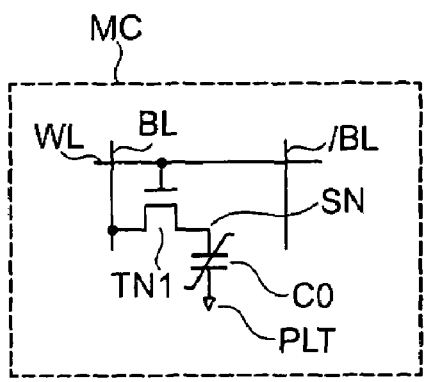
FIGS. 18A, 18B and 18C are timing charts for explaining the operation of a conventional ferroelectric memory.
Figure 18B:
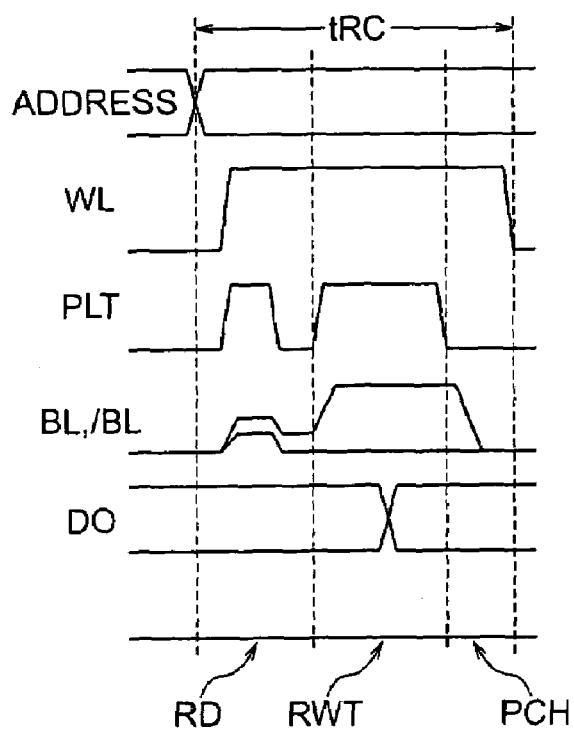
Figure 18C:
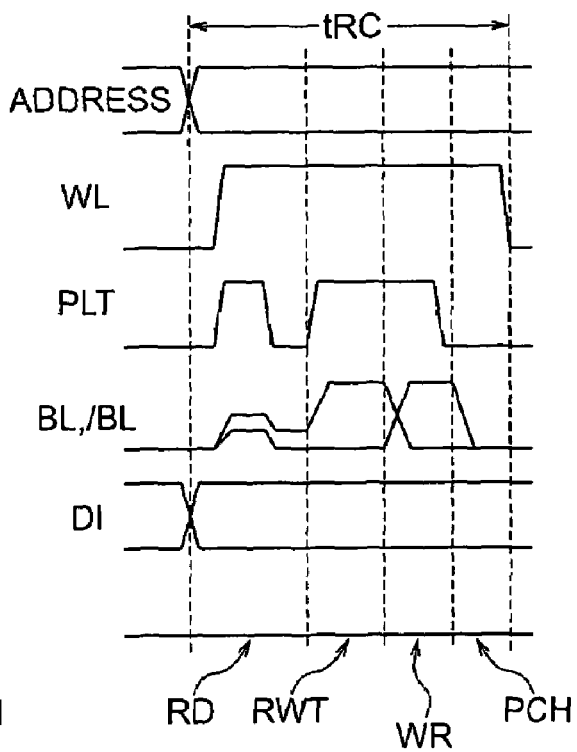

FIG. 18A illustrates a memory cell MC of the FeRAM, while FIGS. 18B, 18C show waveforms associated with the operation of a conventional FeRAM. The memory cell MC comprises a word line WL, a bit line pair BL, /BL, an access transistor TN1, a ferroelectric capacitor CO, and a plate PLT. FIG. 18B is a timing chart representing a read operation of a conventional FeRAM. In the FeRAM, since an accumulation node SN and bit line BL become conductive upon reading on its operation principle, data is destructed. Therefore, once data is read out (RD period), the data must be re-written (RWT period), and then the bit line must be precharged (PCH period), resulting in a long cycle time tRC. Likewise in the write operation represented in FIG. 18C, since an accumulation node SN and a bit line BL of a non-selected memory cell MC, which is not to be accessed, become conductive, a re-write operation is needed after a signal is once read from the accumulation node SN. Further, data is written into a selected memory cell (WR period), and a precharge is performed (PCH period). Also, since the FeRAM utilizes the polarization characteristics of the ferroelectric capacitor CO to hold data, the potential on the plate PLT must be increased to approximately a source voltage in a re-write operation (RWT period) and a write operation (RD period), resulting a prolonged cycle time tRC due to a time required for the activation of the plate PLT associated with the increased potential on the plate PLT.

To solve the foregoing problem, first of all, the present invention removes the re-write operation associated with a read operation of the FeRAM. In other word, the FeRAM is forced to perform a destructive read operation. Since the AF-RAM of the present invention has the cache memory NWC which holds data read from the LWRAM, no data will be lost. When the FeRAM is operated to permit the destruction of data due to a read, the read operation can be performed faster as represented in FIG. 19A. Here, since the FeRAM is operated to permit the destruction of data due to a read, all data once read therefrom must be written into the cache memory NWC. In other words, the bus width of the internal data bus Da[127:0] and the like of the cache memory NWC must be equal to the number of bit lines in the banks of the LWRAM. Since modifications to the circuits required for the foregoing operations can be made by simple circuit techniques, the illustration of such modified circuits is omitted in the figures.

On the other hand, in a write operation represented in FIG. 19B, the bit line must be amplified to a high potential in order to write data, and meanwhile the plate PLT must be kept activated. For this reason, even if the re-write operation is removed by employing the destructive read operation, a write operation may take a longer time than a read time tRC. In such a situation, the problem of a slow write can be solved by using the control method as described in the first and second embodiments. Specifically, in the fourth embodiment, as the cache memory NWC has a number of ways equal to the ratio (m/n) of a write speed (m) to a read speed (n) of the FeRAM as is the case with the foregoing embodiments, the resulting data processing system can eliminate a delay in any access to the AF-RAM.

While the foregoing embodiment has been described in connection with an exemplary memory cell which belongs to a one-transistor, one-capacitor type, the present invention is not limited to this particular type of memory cell, but may be applied to a FeRAM memory cell of two-transistor type. Also, it should be understood that a variety of modifications can be made to the fourth embodiment, as is the case with the aforementioned embodiments.

Fifth Embodiment

While the first embodiment has been described in connection with the logic unit LOGIC and AF-RAM implemented on separate chips and connected through the memory control unit MCU, a modification as described below may be made to the first embodiment.

Figure 20:
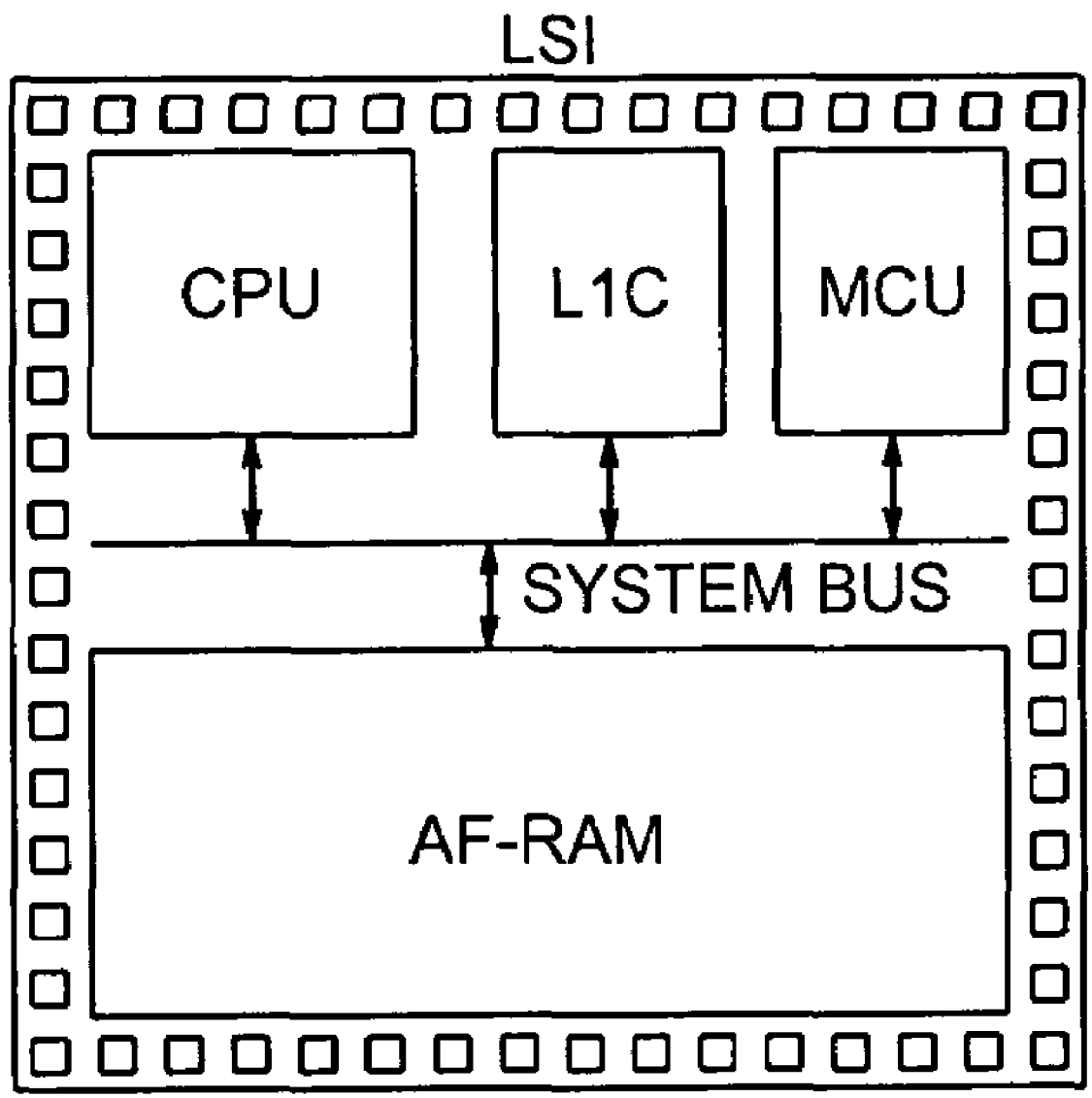
FIG. 20 is a block diagram illustrating an exemplary LSI to which the AF-RAM of the present invention is applied.

FIG. 20 illustrates a one-chip LSI on which a CPU, a cache memory L1C, a memory control unit MCU, and the AF-RAM of the present invention are interconnected through a system bus SYSTEM BUS. The AF-RAM thus mounted on a one-chip LSI can reduce a parasitic capacitance of the bus, as compared with separate chips connected through a bus, and therefore contribute to saving of power consumption. In the fifth embodiment, the logical circuit section is shown to have only a CPU, by way of example, but it should be understood that a plurality of logic circuits may be mounted on a single chip, as is the case with the first embodiment. Further, though not illustrated in FIG. 20, the LSI of this embodiment may be laminated with other SRAM and/or DRAM chips. This can reduce the mounting area of the entire chip to reduce the cost. In addition, it should be understood that a so-called composite memory may be implemented by laminating the AF-RAM, SRAM and DRAM. In this way, a memory having a higher data capacity can be accomplished with a reduced mounting area. As described above, the AF-RAM of the present invention has a variety of applications depending on particular purposes.

The present invention is mainly characterized in that a slow write operation can be concealed by adding a small amount of cache memory even when the data processing system employs a memory cell which is slow in writing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A semiconductor device comprising:
a plurality of memory banks, each having a plurality of memory cells which are slower in a write operation than in a read operation; and
a cache memory for mediating an access to said plurality of memory banks from the outside,
said cache memory having a number of ways equal to or larger than a value determined by a ratio (m/n) of a write cycle (m) of said memory cells to a read cycle (n) of said memory cells;
wherein, when first data is written into said semiconductor device from the outside, and when said cache memory does not hold a first address at which said first data is to be written, second data held in an entry associated with the first address of said cache memory is written back to one of said plurality of memory banks, and said first data is written into said cache memory, and
wherein, when third data is written into said semiconductor device from the outside when the second data is written back to one of said plurality of memory banks and said cache memory does not hold a second address at which said third data is to be written, fourth data held in an entry associated with the second address is written back to a second memory bank, different from the first memory bank, included in said plurality of memory banks.

2. A semiconductor device according to claim 1, wherein:
said cache memory has a plurality of sets corresponding to the number of ways, and
each of said plurality of sets has a capacity for storing whole data stored in one of said plurality of memory banks.

3. A semiconductor device according to claim 1, wherein:
when said cache memory holds data corresponding to an access to said semiconductor device from the outside, the data is communicated from said cache memory.

4. A semiconductor device according to claim 1, further comprising:
a plurality of data input/output nodes for inputting/outputting data to/from the outside,
wherein each said data input/output node has a data width equal to a data width of an external data bus for inputting/outputting information to/from said semiconductor device.

5. A semiconductor device according to claim 1, further comprising:
an internal data bus for coupling said cache memory to said memory banks; and
a plurality of data input/output nodes for inputting/outputting data from/to the outside,
wherein said cache memory has a cache line comprised of a plurality of sublines, and $A = N \cdot B$ is satisfied, where N is the number of said plurality of sublines, A is a bus width of said internal data bus, and B is a bus width of said external data bus.

6. A semiconductor device according to claim 5, wherein:
said cache memory has a plurality of flags each associated with one subline for managing data held thereon; and
when said flag indicates data on said subline as invalid, a write-back operation is not performed from said cache memory to said memory bank.

7. A semiconductor device according to claim 5, wherein:
when a flag indicates that data on said subline has been updated, a data write operation is not performed from said memory bank to said cache memory.

8. A semiconductor device according to claim 1, wherein each said memory cell is either a SESO (Single Electron Shut Off) memory cell or an phase change memory cell.

9. A semiconductor device according to claim 8, wherein said cache memory comprises SRAM memory cells.

10. A semiconductor device according to claim 1, wherein said cache memory comprises SRAM memory cells.

11. A semiconductor device comprising:
a plurality of memory banks, each having a plurality of memory cells which are slower in a write operation than in a read operation; and
a cache memory for mediating an access to said plurality of memory banks from the outside,
said cache memory having a number of ways equal to or larger than a value determined by a ratio (m/n) of a write cycle (m) of said memory cells to a read cycle (n) of said memory cells;
an internal data bus for coupling said cache memory to said memory banks; and
a plurality of data input/output nodes for inputting/outputting data from/to the outside,
wherein said cache memory has a cache line comprised of a plurality of sublines, and $$A = N \cdot B$$

is satisfied, where N is the number of said plurality of sublines, A is a bus width of said internal data bus, and B is a bus width of said external data bus,
wherein, when first data held in said cache memory is written back to one of said plurality of memory banks, and when a first memory bank included in said plurality of memory banks cannot accept an access from the outside due to a write back operation to write second data held in said cache memory, the first data is written back to a second memory bank, different from the first memory bank, included in said plurality of memory banks.

12. A semiconductor device according to claim 11, wherein:
said cache memory has a plurality of sets corresponding to the number of ways, and
each of said plurality of sets has a capacity for storing whole data stored in one of said plurality of memory banks.

13. A semiconductor device according to claim 11, wherein:
when said cache memory holds data corresponding to an access to said semiconductor device from the outside, the data is communicated from said cache memory.

14. A semiconductor device according to claim 11, further comprising:
a plurality of data input/output nodes for inputting/outputting data to/from the outside,
wherein each said data input/output node has a data width equal to a data width of an external data bus for inputting/outputting information to/from said semiconductor device.

15. A semiconductor device according to claim 11, wherein:
said cache memory has a plurality of flags each associated with one subline for managing data held thereon; and
when said flag indicates data on said subline as invalid, a write-back operation is not performed from said cache memory to said memory bank.

16. A semiconductor device according to claim 11, wherein:
when a flag indicates that data on said subline has been updated, a data write operation is not performed from said memory bank to said cache memory.

17. A semiconductor device according to claim 11, wherein each said memory cell is either a SESO (Single Electron Shut Off) memory cell or an phase change memory cell.

18. A semiconductor device according to claim 17, wherein said cache memory comprises SRAM memory cells.

19. A semiconductor device according to claim 11, wherein said cache memory comprises SRAM memory cells.

* * * * *